(12) United States Patent
Sakuraba et al.

(10) Patent No.: US 8,218,191 B2
(45) Date of Patent: Jul. 10, 2012

(54) COMPUTER READABLE RECORDING MEDIUM STORED WITH CONTROL PROGRAM FOR CONTROLLING IMAGE FORMING APPARATUS HAVING A TAB SHEET INSERTION FUNCTION, IMAGE FORMING APPARATUS AND METHOD EXECUTED IN THE IMAGE FORMING APPARATUS

(75) Inventors: Tamotsu Sakuraba, Sagamihara (JP);
Toshimi Shinchi, Saitama (JP);
Michihiro Nakagawa, Sagamihara (JP);
Yukihiko Ichikawa, Tokyo (JP)

(73) Assignee: Konica Minolota Business Technologies, Inc., Chiyoda-Ku, Tokyo (JP)

( * ) Notice: Subject to any disclaimer, the term of this patent is extended or adjusted under 35 U.S.C. 154(b) by 1149 days.

(21) Appl. No.: 11/779,938

(22) Filed: Jul. 19, 2007

(65) Prior Publication Data
US 2008/0175636 A1    Jul. 24, 2008

(30) Foreign Application Priority Data

Jan. 19, 2007 (JP) ................. 2007-009924

(51) Int. Cl.
*G06K 15/00* (2006.01)
*G06F 3/12* (2006.01)
*B41L 1/24* (2006.01)

(52) U.S. Cl. ............... 358/1.18; 358/1.13; 358/1.16; 358/1.9; 358/1.12; 462/62; 462/63

(58) Field of Classification Search ............. 358/1.13, 358/1.16, 1.18, 1.9, 1.12; 462/62, 63
See application file for complete search history.

(56) References Cited

U.S. PATENT DOCUMENTS
2005/0041993 A1* 2/2005 Barry et al. ............ 399/127

FOREIGN PATENT DOCUMENTS
| JP | 11-042872 | 2/1999 |
| JP | 2005-071162 | 3/2005 |
| JP | 2005-271259 A | 10/2005 |

OTHER PUBLICATIONS

Notification of Reason for Refusal in JP 2007-009924 dated Jan. 27, 2009, and an English Translation thereof.
U.S. Appl. No. 11/748,582, Tamotsu Sakuraba et al., filed May 15, 2007.

(Continued)

*Primary Examiner* — Thomas Lett
(74) *Attorney, Agent, or Firm* — Buchanan Ingersoll & Rooney PC

(57) ABSTRACT

The invention provides the user a first insertion page position setting part that allows a user to designate insertion page positions that respectively indicate pages at which first tab sheets are to be inserted, and a second insertion page position setting part that allows the user to designate insertion page positions that respectively indicate pages at which second tab sheets are to be inserted, when a request for initiating the setting concerning the tab sheets is received. Further, the tab positions in the second tab sheets, which correspond to the insertion page positions designated in said second insertion page position setting part, are set up in accordance with the tab positions in the first tab sheets, which correspond to the insertion page positions designated in said first insertion page position setting part.

17 Claims, 27 Drawing Sheets

OTHER PUBLICATIONS

U.S. Appl. No. 11/802,054, Tamotsu Sakuraba et al., filed May 18, 2007.
U.S. Appl. No. 11/802,037, Toshimi Shinchi et al., filed May 18, 2007.
U.S. Appl. No. 11/802,039, Toshimi Shinchi et al., filed May 18, 2007.
U.S. Appl. No. 11/802,038, Toshimi Shinchi et al., filed May 18, 2007.
U.S. Appl. No. 11/748,598, Toshimi Shinchi et al., filed May 15, 2007.
U.S. Appl. No. 11/806,038, Shigeru Sakamoto, filed May 29, 2007.
U.S. Appl. No. 11/822,531, Michihiro Nakagawa et al., filed Jul. 6, 2007.
U.S. Appl. No. 11/771,041, Michihiro Nakagawa et al., filed Jun. 29, 2007.
U.S. Appl. No. 11/812,025, Koichi Ono, filed Jun. 14, 2007.

* cited by examiner (A)

Job header 310:
```
PERPAGESET=TRAY1····5TAB,1,10
PERPAGESET=TRAY2····5TAB,2,4,6,11,12,14
Tab1=1,10
Tab2=2,4,6,11,12,14
```

Page header 320:
- P1 Tray1
- P2 Tray2
- P3 JobTray
- P4 Tray2
- P5 JobTray
- P6 Tray2
- P7 JobTray
- P8 JobTray
- P9 JobTray
- P10 Tray1
- P11 Tray2
- P12 Tray2
- P13 JobTray
- P14 Tray2

COMPUTER READABLE RECORDING MEDIUM STORED WITH CONTROL PROGRAM FOR CONTROLLING IMAGE FORMING APPARATUS HAVING A TAB SHEET INSERTION FUNCTION, IMAGE FORMING APPARATUS AND METHOD EXECUTED IN THE IMAGE FORMING APPARATUS

CROSS-REFERENCE TO RELATED APPLICATION

This application is based on Japanese Patent Application No. 2007-009924, filed on Jan. 19, 2007, the contents of which are incorporated herein by reference.

BACKGROUND

1. Technical Field

The present invention relates to a computer readable recording medium stored with a control program for controlling an image forming apparatus having a tab sheet insertion function, an image forming apparatus, and a method executed in the image forming apparatus.

2. Description of Related Art

There exist printing apparatuses such as copying machines and printers that are capable of creating printed products by inserting between pages a tab sheet having a flat rectangular main body and a tab protruding at a designated position on a side of said may main body. See Unexamined Japanese Patent Publication No. 2005-271259.

Incidentally, if a printed matter consists of "chapters" and "sections," it is desirable from the viewpoint of easy and quick browsing of the printed matter to be distinguishable between the tab sheet to be used at the breakpoints of "chapters" and the tab sheet to be used at the breakpoints of "sections," as well as to be able to grasp which "sections" are included in which specific "chapter."

However, the technology described in the aforementioned document has no consideration for the method of using tab sheets for a plurality of different purposes as exemplified by the tab sheets used at the breakpoints of "chapters" and the tab sheets used at the breakpoints of "sections," so that it does not provide a means of solving the abovementioned problem.

SUMMARY

To solve at least one of the abovementioned problems, there is provided a computer readable recording medium stored with a control program for controlling an image forming apparatus, which reflects one aspect of the present invention. The control program causes a computer to execute a process which comprises: 1) receiving a request for initiating a setting concerning tab sheets; 2) providing a user with a first insertion page position setting part that allows the user to designate insertion page positions at which first tab sheets are to be inserted, respectively; 3) providing the user with a second insertion page position setting part that allows the user to designate insertion page positions at which second tab sheets are to be inserted, respectively; and 4) setting up tab positions in the second tab sheets corresponding to the insertion page positions designated in said second insertion page position setting part in accordance with tab positions in the first tab sheets corresponding to the insertion page positions designated in said first insertion page position setting part.

The positions of the tabs of the first tabs that respectively correspond to the insertion page positions designated by said first insertion page position setting part are preferably set up by an instruction of the user.

In said step 4), a top edge position of the tab of the each of the second tab sheets is preferably set up lower than a bottom edge position of the tab of the first tab sheet inserted at a page ahead of and closest to the particular second tab sheet.

In said step 4), a top edge position of the tab of each of the second tab sheets is preferably set up to be the same level or lower than a top edge position of the tab of the first tab sheet inserted at a page ahead of and closest to the particular second tab sheet.

In said step 4), a bottom edge position of the tab of each of the second tab sheets is further preferably set up to be the same level or higher than a bottom edge position of the tab of the first tab sheet inserted at a page ahead of and closest to the particular second tab sheet.

In said step 4), a bottom edge position of the tab of each of the second tab sheet is further preferably set up to be the same level or higher than a top edge position of the tab of the first tab sheet inserted at a page ahead of and closest to the particular second tab sheet.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 18 is a conceptual diagram of the header information.

DETAILED DESCRIPTION

The embodiment of this invention will be described below with reference to the accompanying drawings.

Figure 1:
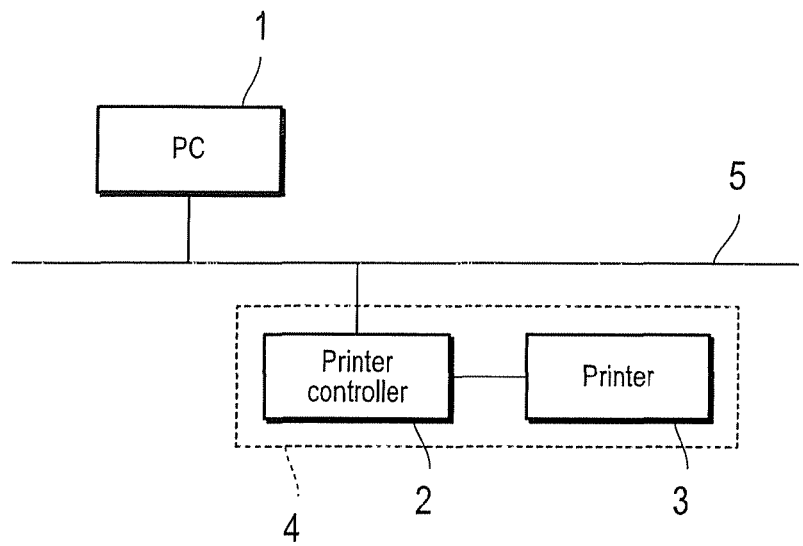
FIG. 1 is a block diagram showing the overall constitution of a network system according to a first embodiment of the present invention.

FIG. 1 is a block diagram showing the overall constitution of a network system according to a first embodiment of the present invention.

The network system that relates to this embodiment is equipped with a PC 1 as a printing instruction device for instructing the printing of the document and a printing system 4 for conducting printing based on printing instructions of the PC 1, which are connected with each other via a network 5. Also, the PC 1 and the printing system 4 can be connected directly (local connection) without recourse to the network 5.

The printing system 4 consists of a printer controller 2 and a printer 3 as an image forming apparatus and also as a tab sheet insertion apparatus, which are locally connected with each other. This local connection can be accomplished by means of various local connection interfaces, such as serial interfaces, e.g., USB and IEEE 1394, parallel interfaces, e.g., SCSI and IEEE 1284, wireless communication interfaces, e.g., Bluetooth®, IEEE 802.11, HomeRF®, IrDA®, etc. However, the printer controller 2 and the printer 3 can be connected via the network 5.

Figure 2:
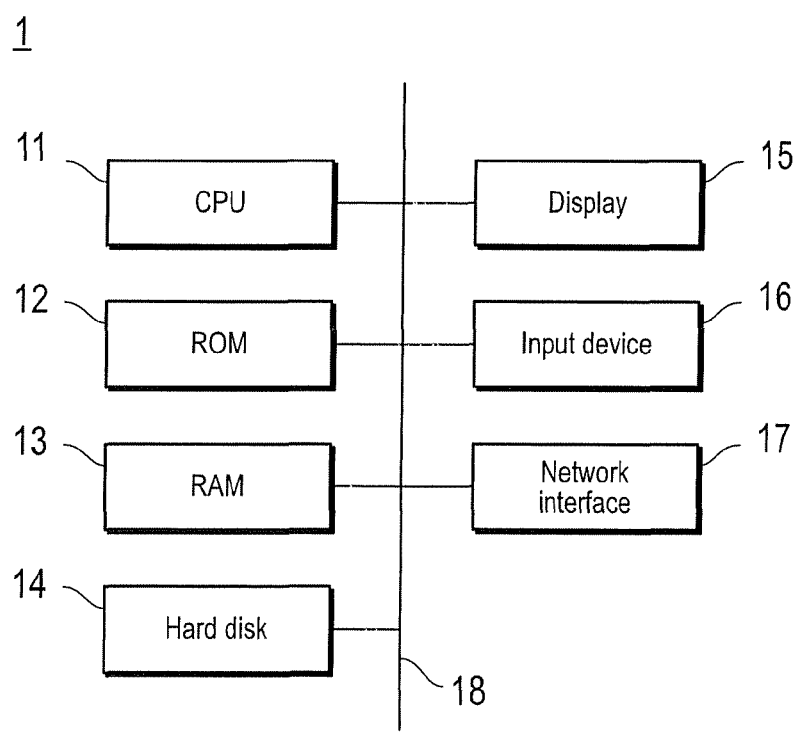
FIG. 2 is a block diagram showing the constitution of the PC shown in FIG. 1.

FIG. 2 is a block diagram showing the constitution of PC 1 shown in FIG. 1.

The PC 1 contains a CPU 11, a ROM 12, a RAM 13, a hard disk 14, a display 15, an input device 16 and a network interface 17, all of which are interconnected via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

An application program for generating document files and a printer driver for converting the document files into PDL data described in a Page Description Language ("PDL") understood by the printing system 4 are installed on the hard disk 14. The printer driver is capable of providing instructions for printing document files prepared with the use of applications, setting up printing output conditions, and setting up tab sheet related matters. The printer driver contains programs for executing these settings.

The display 15 can be LCD, CRT, and other displays, on which various kinds of information are displayed. The input device 16 includes a pointing device such as a mouse, a keyboard, and others, and is used for executing various kinds of information inputs.

The network interface 17 is an interface for communicating with other devices on the network via the network 5 using standards such as Ethernet®, Token Ring, FDDI, etc.

Figure 3:
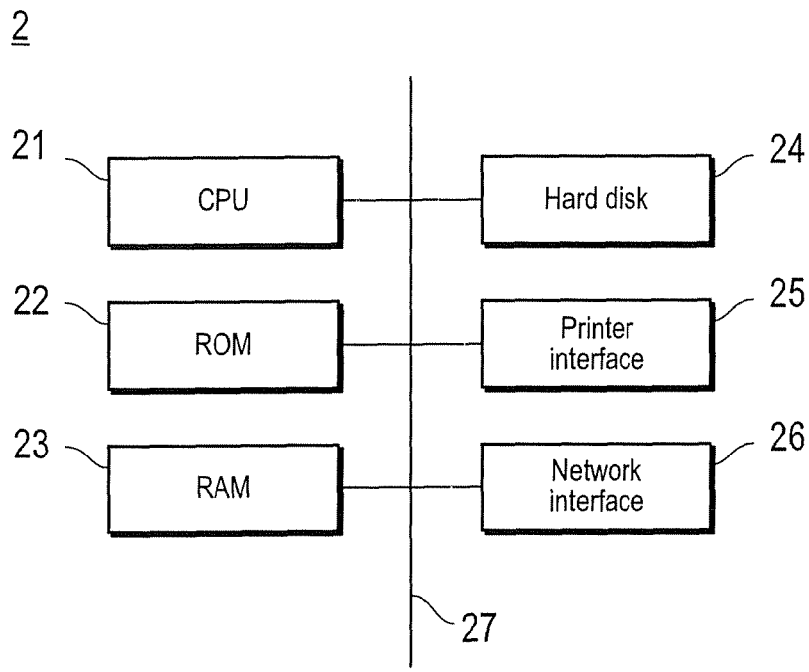
FIG. 3 is a block diagram showing the constitution of the printer controller of the printing system shown in FIG. 1.

FIG. 3 is a block diagram showing the constitution of the printer controller 2 of the printer system 4 shown in FIG. 1.

The printer controller 2 is provided with a CPU 21, a ROM 22, a RAM 23, a hard disk 24, a printer interface 25, and a network interface 26, all of which are interconnected with each other via a bus 27 for exchanging signals. The descriptions of those parts of the printer controller 2 that have the same functions as those of the corresponding parts of the PC 1 will be omitted here to avoid being duplicative.

The ROM 22 and hard disk 24 stores a rasterizing process program for translating PDL data received from PC1 and developing it into bitmap data, which is bitmap type image data, as well as an image data process program for analyzing the received PDL data. The received PDL data and the bitmap data can be saved on the hard disk 24.

The printer interface 25 is an interface for communicating with the locally connected printer 3.

Figure 4:
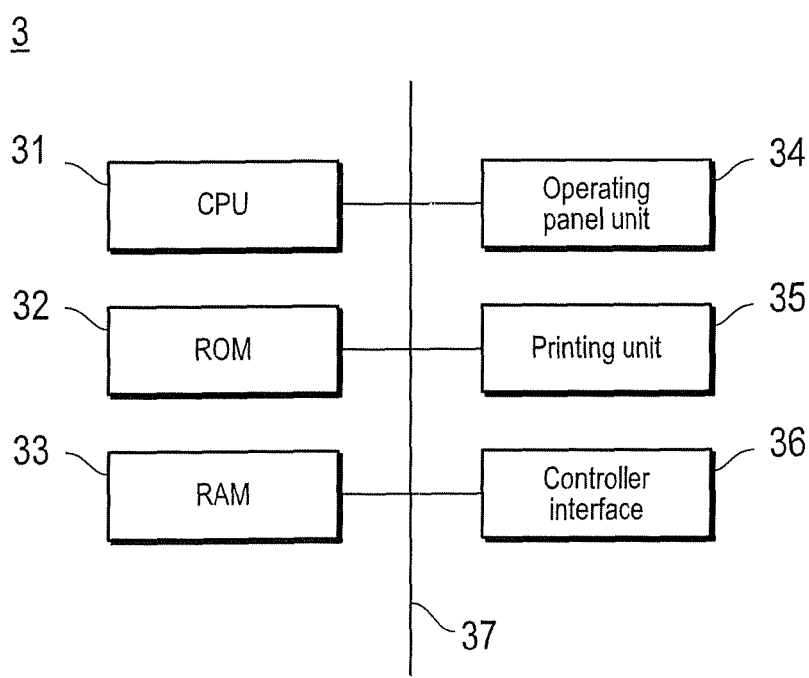
FIG. 4 is a block diagram showing the constitution of the printer of the printing system shown in FIG. 1.

FIG. 4 is a block diagram showing the constitution of the printer 3 of the printing system 4 shown in FIG. 1. The printer 3 has a CPU 31, a ROM 32, a RAM 33, an operating panel 34, a printing unit 35, and a controller interface 36, all of which are interconnected with each other via a bus 37 for exchanging signals. The descriptions of those parts of the printer 3 that have the same functions as those of the corresponding parts of the PC 1 will be omitted here to avoid being duplicative.

The ROM 32 stores a printing process program to be executed based on printing data containing bitmap data received from the printer controller 2.

The operating panel unit 34 is equipped with a touch panel, a ten-key pad, a start button, a stop button and others to be used for displaying various data and entering various instructions.

The printing unit 35 prints images based on bitmap data received from the printer controller 2 using a publicly known imaging process such as the electronic photography process on recording media such as paper. The controller interface 36 is an interface for communicating with the locally connected printer controller 2.

Figure 5:
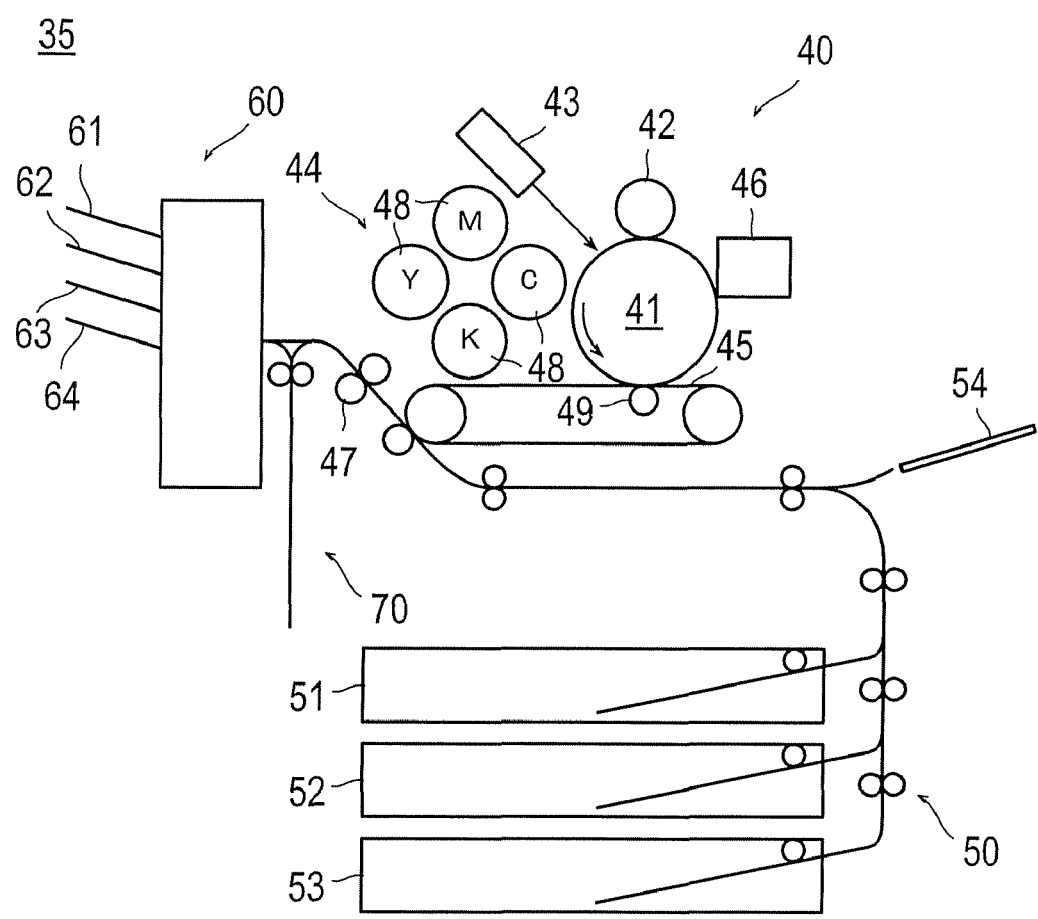
FIG. 5 is a diagram showing the typical constitution of a printing unit.

FIG. 5 is a diagram showing the typical constitution of a printing unit 35.

The printing unit 35 has a paper supply unit 50 for supplying recording media such as printing paper and insertion sheets such as tab sheets, an image forming unit 40 for forming images on the recording media, and a paper discharge unit 60 for discharging printing paper and tab sheets. The printing unit 35 also has a reversing mechanism unit 70 for reversing the front and back sides of printing paper.

The image forming unit 40 of the printing unit 35 has a sensitizer drum 41 that rotates in the arrow direction, a charging device 42, exposing device 43, a developing device 44, an intermediate transfer belt 45, a cleaning device 46, and a fixing device 47. After the surface of the sensitizer drum 41 is evenly charged by means of the charging device 42, an electrostatic latent image is formed on the surface of the sensitizer drum 41 as it is irradiated with laser beams by the exposing device 43. The electrostatic latent image becomes an apparent image as the toner adheres to the electrostatic latent image on the sensitizer drum 41 in accordance with the rotation of the sensitizer drum 41. The developing device 44 has developing rollers 48 of cyan (C), magenta (M), yellow (Y), and black (K) respectively. The toner images of these colors thus becoming apparent images are then transported to the transferring unit 49 where they are transferred onto the intermediate transfer belt 45 one after the other to be overlaid on top of each other. The overlaid color images are then transferred onto the printing paper supplied by the paper supply unit 50. The toner images are then fixed on the printing paper by the fixing device 47 and transported to the paper discharge unit 60.

The paper supply unit 50 has a plurality of sheet supply trays 51-54. The sheet supply tray 54 is a manual feed sheet supply tray. The paper discharge unit 60 is equipped with a plurality of paper discharge trays 61-64. The paper discharge unit 60 may have a post-processing part for providing post-processes such as punching or stapling to the printing paper transported there.

Figure 6:
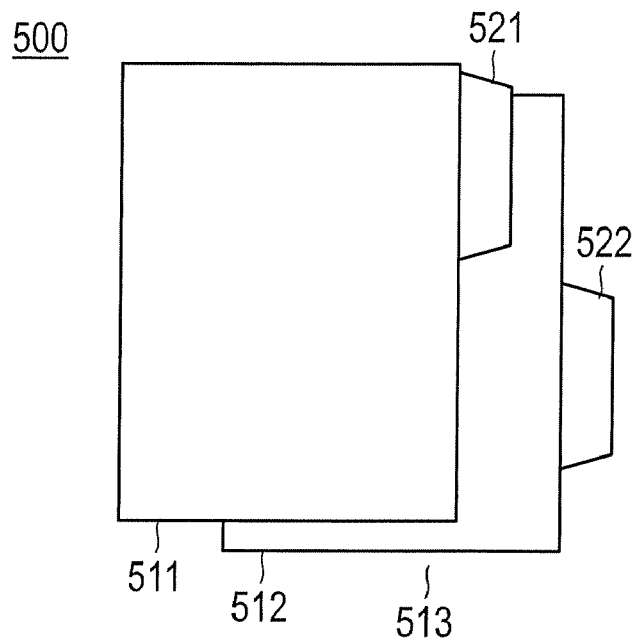
FIG. 6 is a diagram showing tab sheets used in this embodiment.
Figure 6:
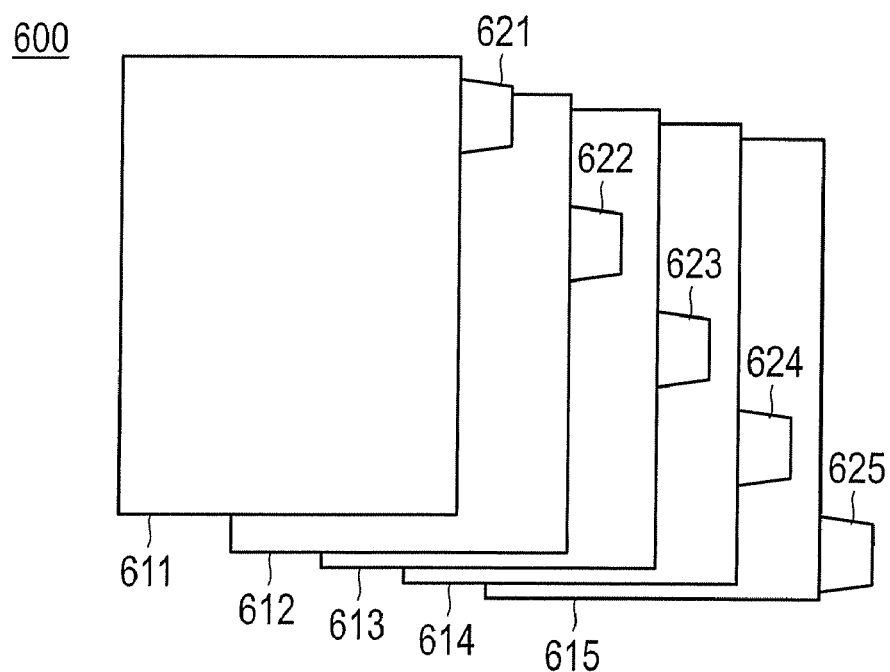

FIG. 6 shows an example of the tab sheet used in this embodiment, wherein (A) showing a two tab sheet 500 and (B) showing a five tab sheet 600. Tab sheets are also called index sheets. As shown in FIG. 6 (A), the tab sheet 500 is a set consisting of two sheets 511 and 512 and is called a "two-tab." Each of the tab sheets 511 and 512 has a flat rectangular main body and a tab 521 or 522 respectively protruding at a designated position on a side of said main body. As shown in FIG. 6 (B), the tab sheet 600 is a set consisting of five sheets 611-615 and is called a "five-tab." Each of the tab sheets 611-615 has a flat rectangular main body and a tab 621-625 respectively protruding at a designated position on a side of said main body.

The order of the tab sheets shown in FIG. 6 is called the normal order and is arranged in such a way that the tab of an upper layer sheet is found above the tab of a lower layer sheet in FIG. 6 when all of their tabs are on the right side. In case of the two-tab tab sheet 500, the tabs 521 and 522 are provided on one side of the main body lowering their positions sequentially in two steps from the top to the bottom. The position of the tab 521 is called ½, and the position of the tab 522 is called ²⁄₂. In case of the five-tab tab sheet 600, the tabs 621-625 are provided on one side of the main body lowering their positions sequentially in five steps from the top to the bottom. The positions of the tabs 621, 622, 623, 624, and 625 are identified as ⅕ (one-fifth), ⅖ (two-fifths), ⅗ (three-fifths), ⅘ (four-fifths), and ⅗ (five-fifths) respectively. The tab sheets 500 and 600 are normally provided in multiple sets in the sheet supply tray.

The operation of the network system in this embodiment will be described in the following.

FIG. 7-FIG. 11 are flowcharts showing the process sequence on the PC 1. The algorithm shown in the flowcharts of FIG. 7-FIG. 11 is stored as a program in a storage unit such as a hard disk 14 of the PC 1 and executed by the CPU 11.

As a preamble, a document file to be printed is prepared by the PC 1. The document file is prepared by an application installed on the PC 1.

When the printing process for a document file is executed, the printer driver is activated via printing setting dialogs of the application based on the user's operation (S101).

Next, when a tab paper setting button 101 is clicked on the printing setting screen which is displayed by the printer driver, the tab paper setting start request is received and the tab sheet setting screen will be displayed on the display 15 (S102).

Figure 12:
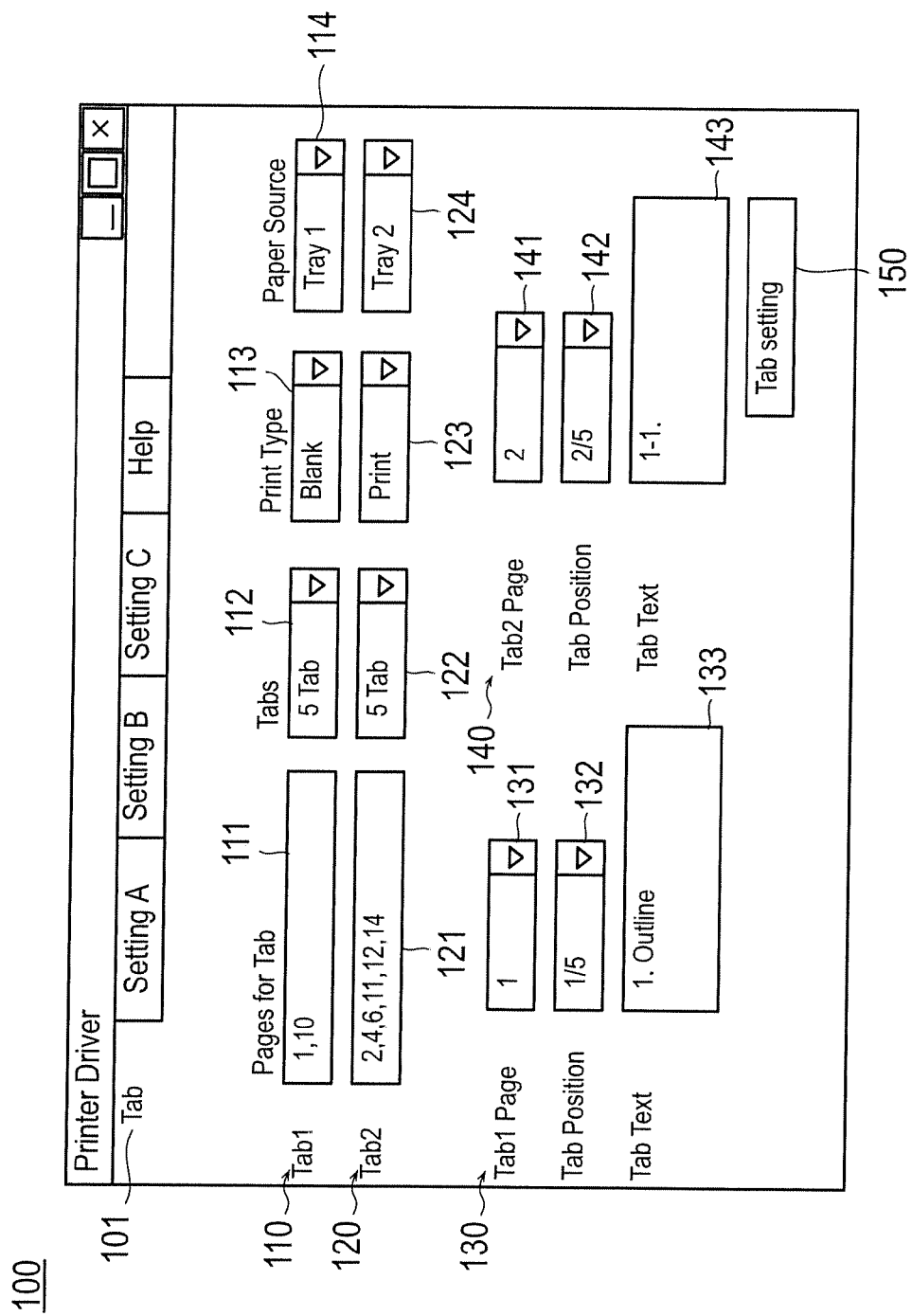
FIG. 12 is a diagram showing an example tab sheet setting screen.

FIG. 12 is a diagram showing an example tab sheet setting screen 100.

The tab sheet setting screen 100 has a first tab sheet insertion setting part 110 for setting up the first tab sheet's insertion, and a second tab sheet insertion setting part 120 for setting up the second tab sheet's insertion.

The first tab sheet insertion setting part 110 includes a first insertion page position setting part 111 which the user can use to designate the insertion page position where a tab sheet is inserted, and the second tab sheet insertion setting part 120 includes a second insertion page position setting part 121 which the user can use to designate the insertion page position where a tab sheet is inserted. Here the term "page" signifies a page of a document which is the object of the printing process and is a notion that does not include the tab paper. In the present embodiment, the tab sheet is inserted ahead of the page designated as the insertion page position in the setting process. However, the tab sheet can be inserted behind the page designated as the insertion page position in the setting process.

The first tab sheet insertion setting part 110 includes a first tab sheet type setting part 112 that the user can use for selecting a type of tab sheet, and the second tab sheet insertion setting part 120 includes a second tab sheet type setting part 122 that the user can use for selecting another type of tab sheet. The first tab sheet type setting part 112 and the second tab sheet type setting part 122 each displays a plurality of options for selecting the type of tab sheet. The type of tab sheet is not limited to the two-tab and five-tab sheets shown in FIG. 6, rather it can include tab sheets consisting of other numbers of tabs such as three, seven and 10 tabs, or tab sheets of different colors.

The first tab sheet insertion setting part 110 includes a first tab printing part 113 for setting up whether any printing is to be executed on the tab of the tab sheet, and the second tab sheet insertion setting part 120 includes a first tab printing part 123 for setting up whether any printing is to be executed on the tab of the tab sheet. The available options here are "Print" and "Blank," where selecting "Print" causes the tab to be printed and selecting "Blank" causes the tab not to be printed.

The first tab sheet insertion setting part 110 includes a first sheet supply tray setting part 114 that the user can use for selecting a tab sheet supply tray, and the second tab sheet insertion setting part 120 includes a second sheet supply tray setting part 124 that the user can use for selecting another tab sheet supply tray. The first sheet supply tray setting part 114 and the second sheet supply tray setting part 124 each displays a plurality of options for selecting sheet supply trays. "Tray 1" designates a sheet supply tray 51 and "Tray 2" designates a sheet supply tray 52 (see FIG. 5).

The tab sheet setting screen 100 further has a first tab sheet setting part 130 for setting up a tab sheet that corresponds to the inserting page position set up in the first insertion page position setting part 111, and a second tab sheet setting part 140 for setting up a tab sheet that corresponds to the inserting page position set up in the second insertion page position setting part 121.

The first tab sheet setting part 130 includes a first object page position setting part 131 that the user can use for designating an object page position in the setting process, and the second sheet setting part 140 includes a second object page position setting part 141 that the user can use for designating an object page position in the setting process. The first object page position setting part 131 displays in a selectable manner the insertion page position set up in the first page position setting part 111. For example, in case of FIG. 12, the first object page position setting part 131 displays two options of page 1 or 10. The second object page position setting part 141 displays the insertion page position set up in the second page position setting part 121. For example, in case of FIG. 12, the second object page position setting part 141 displays six options of page 2, 4, 6, 11, 12 or 14.

Also, the first tab sheet setting part 130 includes a first tab position setting part 132 for designateing the tab position in the tab sheet that corresponds to the insertion page position set up in the first insertion page position setting part 111. On the other hand, the second tab sheet setting part 140 includes a second tab position display part 142 for displaying the tab position in the chapter tab sheet that corresponds to the insertion page position set up in the second insertion page position setting part 121.

In this embodiment, the tab position in the second tab sheet corresponding to the insertion page position designated in the second insertion page position setting part 121 is automatically set up in accordance with the tab position in the first tab sheet corresponding to the insertion page position designated in the first insertion page position setting part 111, and the tab position thus set up is displayed on the second tab position display part 142.

Although it is constituted in this embodiment in such a ways that the tab position of the first tab sheet corresponding to the insertion page position designated in the first insertion page position setting part 111 is set up based on the user's instruction at the first tab position setting part 132, it can also be constituted in such a way as to have it automatically set up in the order of tab sheet stacking.

The first tab sheet setting part 130 includes a first tab printing information setting part 133 for designating the tab printing information on the tab sheet that corresponds to the insertion page position designated in the first insertion page position setting part 111, and the second tab sheet setting part 140 includes a second tab printing information setting part 143 for designating the tab printing information on the tab sheet that corresponds to the insertion page position designated in the second insertion page position setting part 121.

Figure 13:
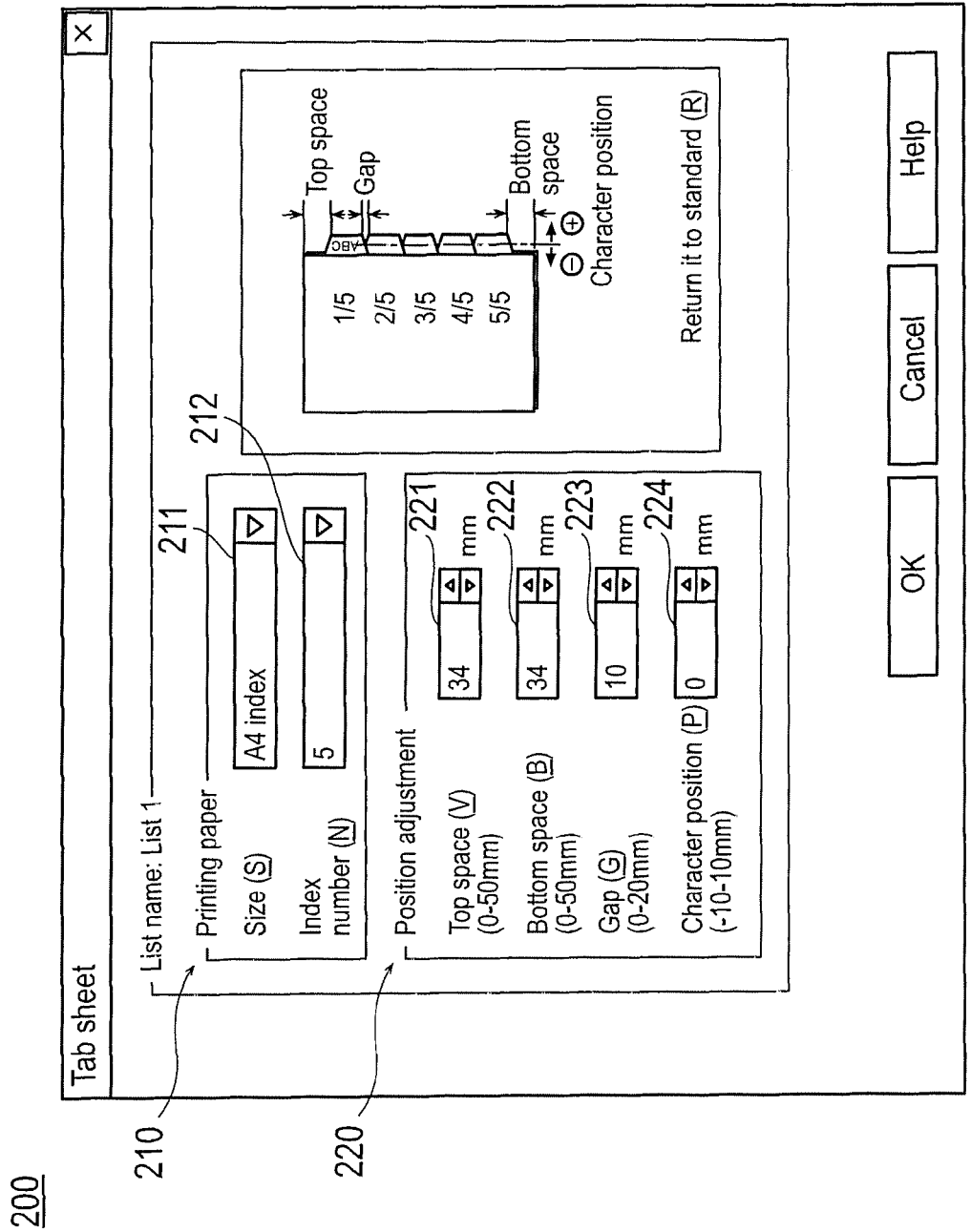
FIG. 13 is a diagram showing an example tab sheet detail setting screen.

The tab sheet setting screen 100 further has a display button 150 to display a tab sheet detail setting screen for executing detail setting concerning tab sheets. When the user clicks on the display button 150, a tab sheet detail setting screen 200 is displayed as shown in FIG. 13.

The tab sheet detail setting screen 200 contains a tab sheet type designateing part 210 for designateing the type of tab sheet and a tab sheet constitution setting part 220 for setting up the constitution of the tab sheet designated in the tab sheet type designateing part 210. The tab paper type designateing part 210 includes a tab paper size designateing part 211 for designateing the size of a tab sheet and a Tab number designateing part 212 for designateing the number of tab sheets with different tab positions within one set (Tab number or index member). Also, the tab sheet constitution setting part 220 includes a top space setting part 221 for setting up the top space that indicates the distance from the top edge of a tab sheet to the top edge position of the highest level tab, a bottom space setting part 222 for setting up the bottom space that indicated the distance from the bottom edge position of the lowest level tab to the bottom edge of a tab sheet, a gap setting part 223 for setting up a gap between tabs that are adjoining to each other vertically among tabs lined up from the top of one side of the main body, and a character position setting part 224 for setting up the position of a character printed on the tab of a tab sheet.

Figure 7:
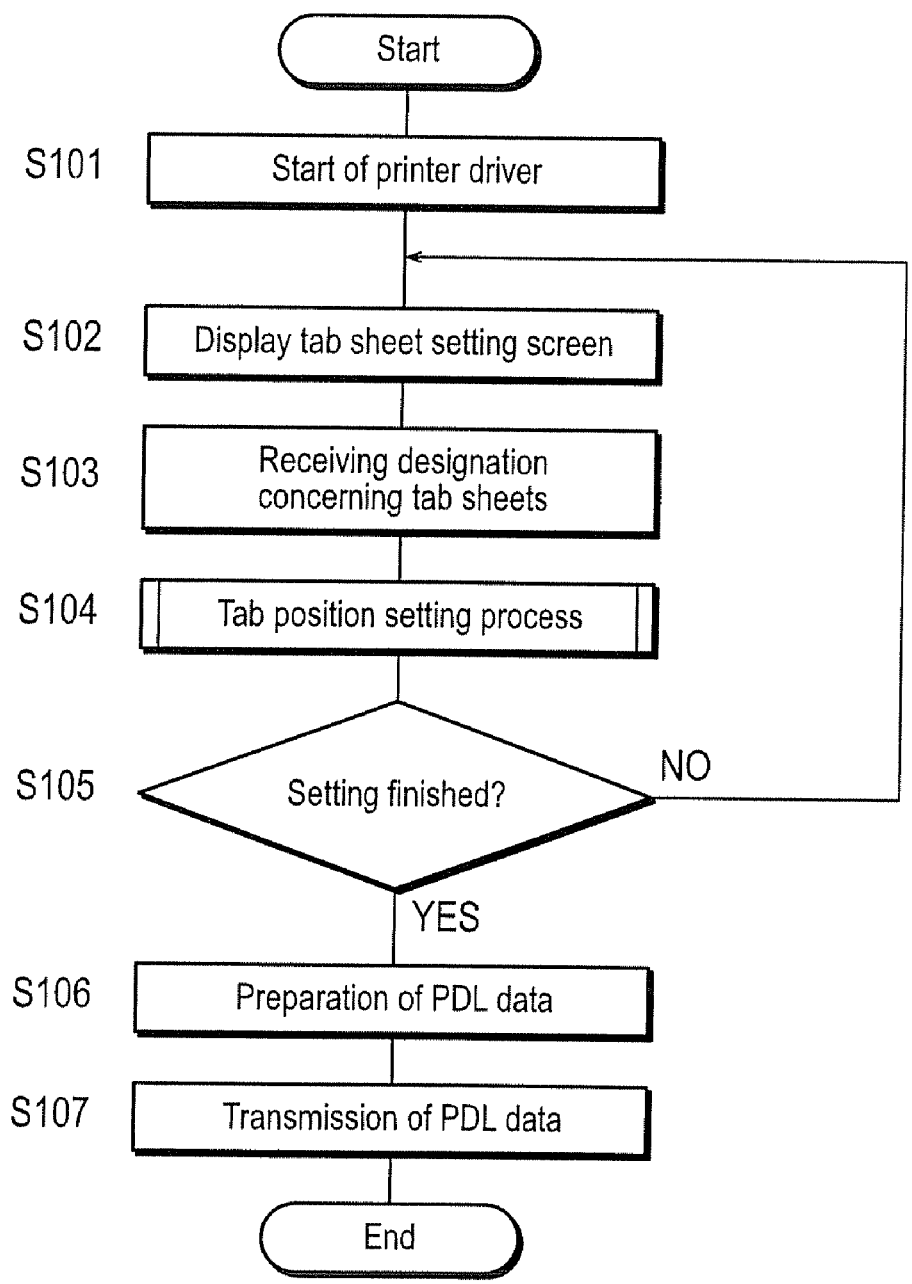
FIG. 7 is a flowchart showing the process sequence on the PC.

Going back to the flowchart of FIG. 7, the designation about the tab sheet is received in step S103. More specifically, the designation about the type of tab sheet is designated there. The user designates the type of the first tab sheet at the first tab sheet type setting part 112 and designates the type of the second tab sheet at the second tab sheet type setting part 122. Also, the designation about the tab sheet insertion page is received there. In other words, the user enters at the first insertion page position setting part 111 the page at which the user wants the first tab sheet to be inserted and enters at the second insertion page position setting part 121 the page at which the user wants the second tab sheet to be inserted. Also, the sheet supply tray for supplying tab sheets is designated as well. The user designates a first sheet supply tray for the first tab sheet at the first sheet supply tray setting part 114 and designates a second sheet tray for the second tab sheet at the second sheet tray setting part 124. Also, the designation about the tab sheet printing is received as well. First, the user designates whether to print the tab of the first tab sheet or not at the first tab printing setting part 113, and whether to print the tab of the second tab sheet or not at the second tab printing setting part 123. Next, the user designates at the first object page position setting part 131 the object page position for setting up the tab sheet corresponding to the insertion page position set up in the first insertion page position setting part 111. The user also designates the tab position of the tab sheet at the first tab position setting part 132. The user further designates the information to be printed on the tab of the tab sheet at the first tab printing information setting part 133. The user can designate similar items at the second page position sheet setting part 141, and at the second tab sheet setting part 143, as those items designated at the first tab sheet setting part 130.

In step S104, the tab position setting process is performed. In the tab position setting process, the tab position of the second tab sheet is automatically set up in accordance with the tab position for the first tab sheet. The detail for such a tab position setting process will be discussed later.

In step S105, a judgment is made as to whether the setting work on the tab sheet setting screen 100 has been completed or not. For example, when the display is switched to a different printing setting screen from the tab sheet setting screen 100 and the instruction button for printing start (not shown) is clicked, it is judged that the setting work at the tab sheet setting screen 100 is finished. If the setting work at the tab sheet setting screen 100 has not been completed (S105: No), the system returns to step S102.

If the setting work at the tab sheet setting screen 100 has been completed (S105: Yes), PDL data is generated as the document file prepared by using the application (S106).

The setting information concerning the tab sheet obtained in steps S103 and S104 is written into the PDL data as command data. For example, the command data "PERPAGESET=TRAY 1 . . . 5 TAB, 1, 10" indicates that the supply source of the tab sheet is "Tray 1" (the supply tray 51 shown in FIG. 5), the type of the tab sheet is 5-tab, and the tab sheet insertion positions are pages 1 and 10. Other setting information is described as command data in the PDL data.

Next, in step S107, the PDL data thus prepared is transmitted to the printer controller 2 of the printing system 4 via the network 5.

Figure 8:
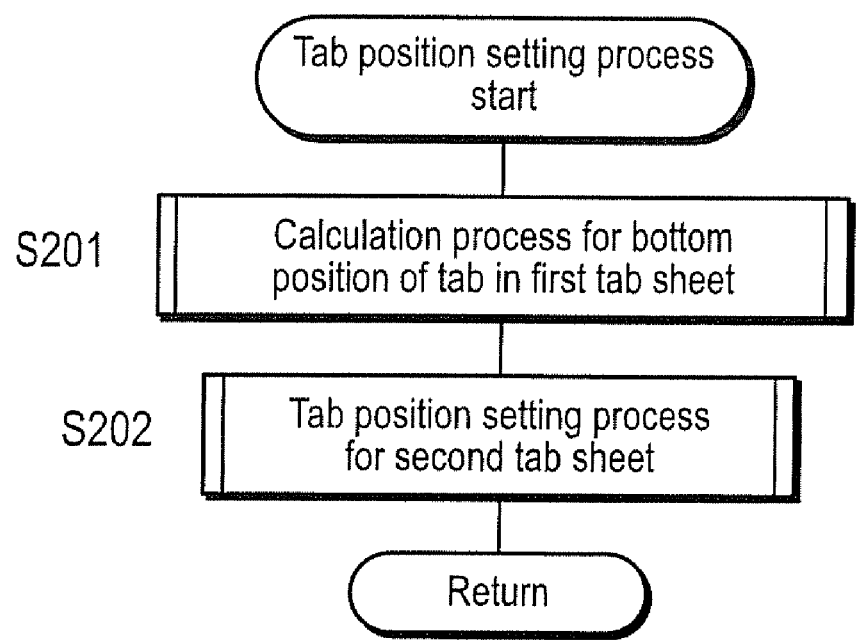
FIG. 8 is a flowchart showing the process sequence for setting up the tab position.

Next, the tab position setting process in step 104 will be described below with reference to FIG. 8. Firstly, the bottom edge position of the tab of the first tab sheet is calculated (S201), and then the setting process for the tab position of the second tab sheet is executed (S202).

Figure 9:
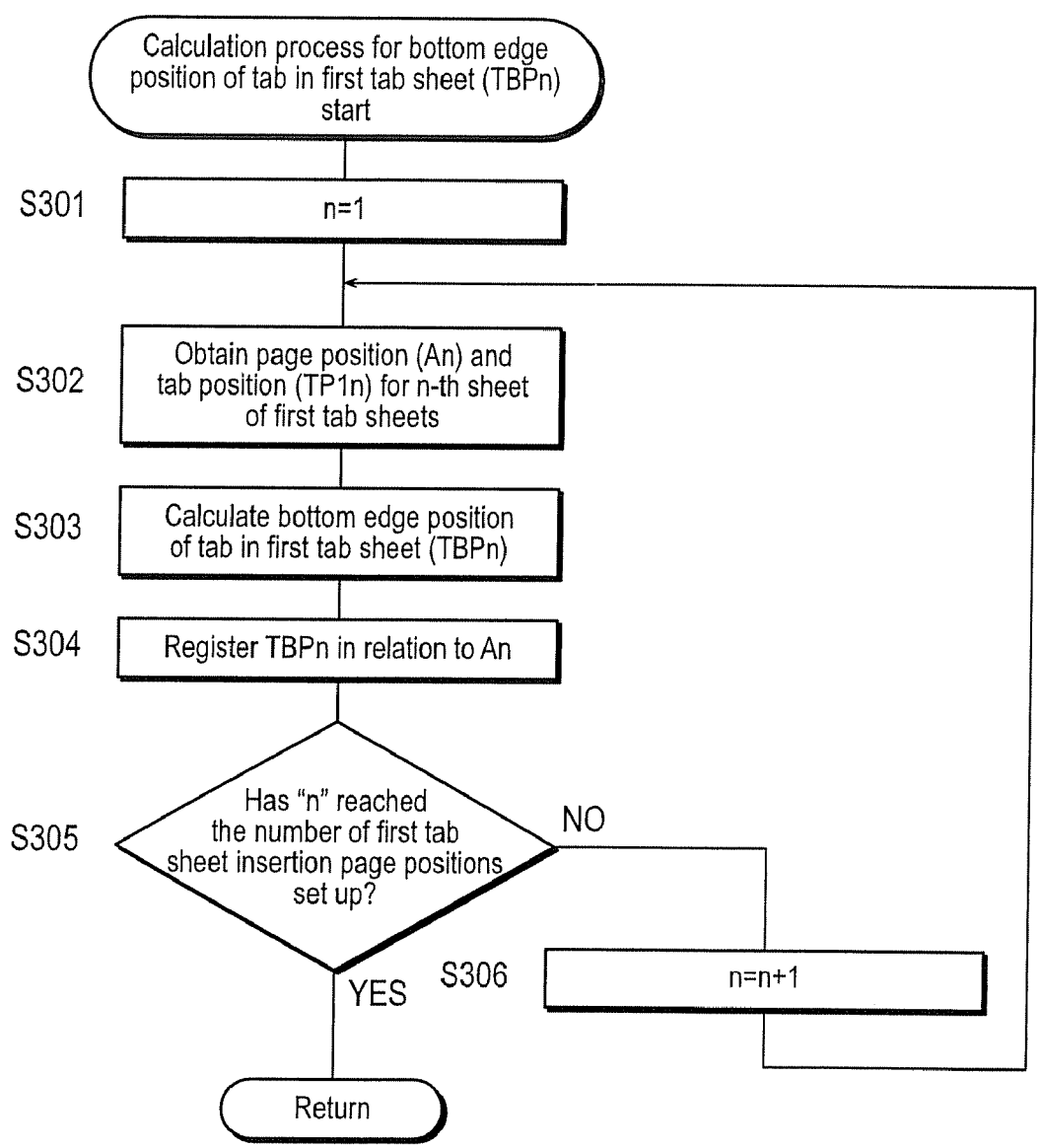
FIG. 9 is a flowchart showing the process sequence for calculating the bottom edge position of the tab of the first tab sheet.

As shown in FIG. 9, in the calculation process of the tab bottom edge position for the first tab sheet, an initial value "1" is first set to the counter "n" (S301).

Next, the page position (An) and the tab position (TP1$n$) are obtained for the n-th sheet of the first tab sheets. An and TP1$n$ are obtained based on the setting values of the tab sheet setting screen 100. For example, in case of FIG. 12, A1=1 and TP11=⅕ are obtained for the first sheet of the first tab sheets.

The bottom edge position (TBPn) of the n-th sheet of the first tab sheets is calculated according to the following formula (S303).

$$TBPn=(\text{vertical size of paper−top space−bottom space−gap}*(\text{Tab number}-1))*TP1n+\text{top space}+\text{gap}*(TP1n*\text{Tab number}-1)$$

The bottom edge position of the tab is the distance from the top edge of the tab sheet to the bottom edge of the tab.

The bottom edge position of the n-th sheet of the first tab sheets (TBPn) is registered in the storage part of the RAM 13 and others in relation to the page position (An) (S304).

In step S305, a judgment is made as to whether "n" has reached the number set up as the number of the first tab sheet insertion page positions or not. For example, in case of FIG. 12, the insertion page positions of the first tab sheets are page 1 and page 10, the setting number is "2."

If it is judged that "n" has not yet reached the number set up as the number of the first tab sheet insertion page positions (S305: No), the program returns to step S302 after incrementing the counter "n" by 1 (S306). On the other hand, if it is judged that "n" has reached the number set up as the number of the first tab sheet insertion page positions (S305: Yes), the program returns to the flowchart of FIG. 8.

Figure 10:
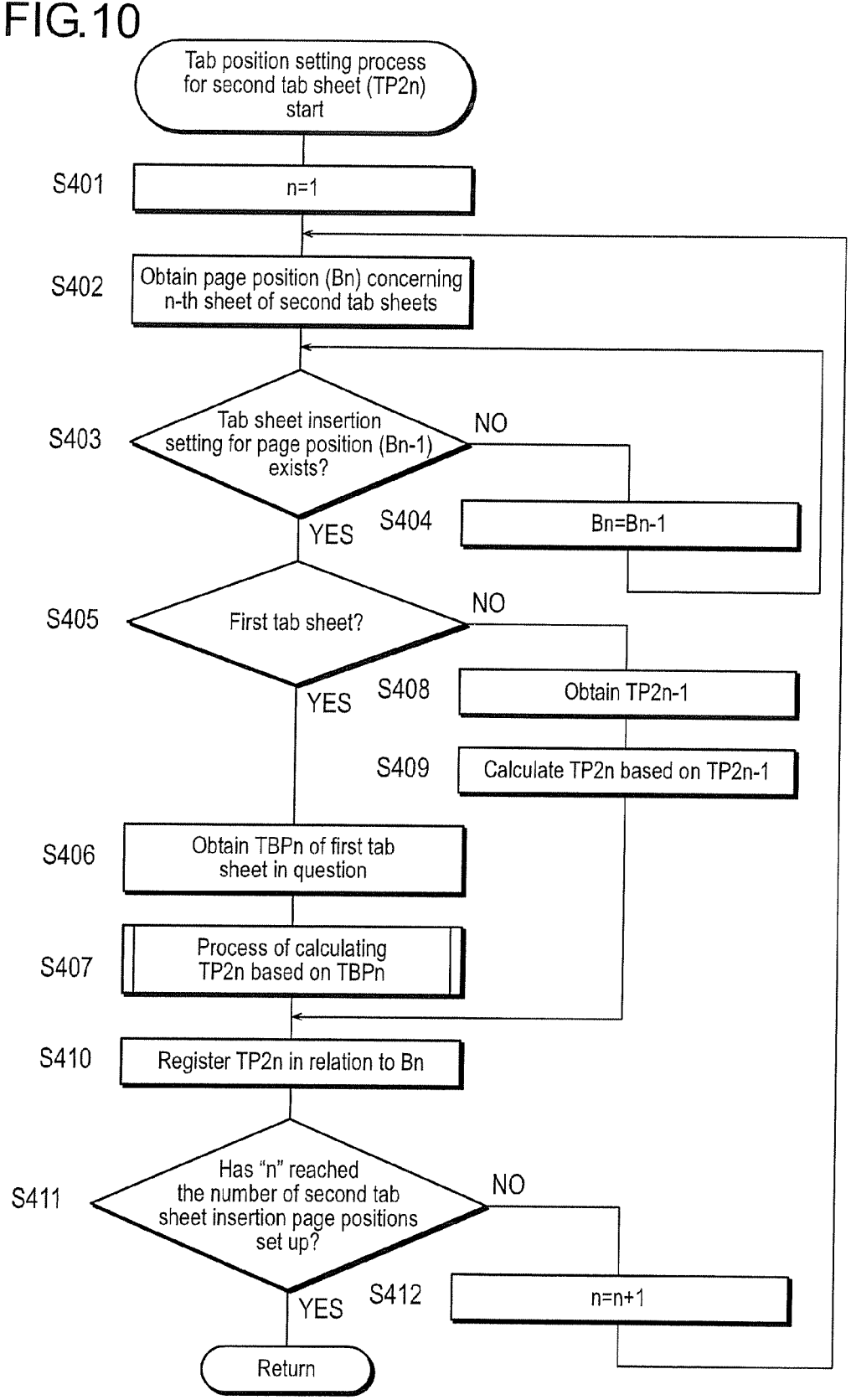
FIG. 10 is a flowchart showing the process sequence for setting up the tab position of the second tab sheet.

Next, as shown in FIG. 10, in the calculation process of the tab position for the second tab sheet, an initial value "1" is first set to the counter "n" (S401).

Next, the page position (Bn) is obtained for the n-th sheet of the second tab sheets. Bn is obtained based on the designated values in the tab sheet setting screen 100. For example, in case of FIG. 12, B1=2 is obtained for the first sheet of the second tab sheets.

In step S403, a judgment is made as to whether the tab sheet insertion setting is performed for the page position (Bn−1). In other words, a judgment is made as to whether a tab sheet is inserted or not at the page immediately before the page position (Bn).

If it is judged that no tab sheet insertion setting is made at the page position (Bn−1) (S403: No), Bn is decremented by 1 (S404), and the program returns to step S403. In other words, Bn is decremented to the page position where the tab sheet insertion setting exists.

If it is judged that the tab sheet insertion setting is made at the page position (Bn−1) (S403: Yes), a judgment is made as to whether the tab sheet for which the insertion setting exists is a first tab sheet or not.

If it is judged that the tab sheet for which the insertion setting exists is a first tab sheet (S405: Yes), the bottom edge position of the tab (TBPn) of the first tab sheet in question is obtained (S406).

Next, the tab position of the n-th sheet of the second tab sheets (TP2$n$) is calculated based on the bottom edge position of the first tab sheet (TBPn) in question (S407). The detail of such a TP2$n$ calculation process based on TBPn will be described later.

On the other hand, if it is judged that the tab sheet for which the insertion setting exists is not a first tab sheet (S405: No), the tab position for the (n−1)-st sheet of the second tab sheets (TP2$n$−1) is obtained (S408).

Next, the tab position of the n-th sheet of the second tab sheets (TP2$n$) is calculated based on the tab position of the (n−1)-st sheet of the second tab sheets (TP2$n$−1) (S409). In other words, it is calculated as: TP2$n$=(TP2$n$−1)+1/Tab number.

In step S410, the tab position of the n-th sheet of the second tab sheets (TP2$n$) is registered in the storage part of the RAM 13 and others in relation to the page position (Bn).

In step S411, a judgment is made as to whether "n" has reached the number set up as the number of the second tab sheet insertion page positions or not. For example, in case of FIG. 12, the insertion page positions of the second tab sheets are pages 2, 4, 6, 11, 12, and 14, the setting number is "6."

If it is judged that "n" has not yet reached the number set up as the number of the second tab sheet insertion page positions (S411: No), the program returns to step S402 after incrementing the counter "n" by 1 (S412). On the other hand, if it is judged that "n" has reached the number set up as the number of the second tab sheet insertion page positions (S411: Yes), the program returns to the flowchart of FIG. 8.

Figure 11:
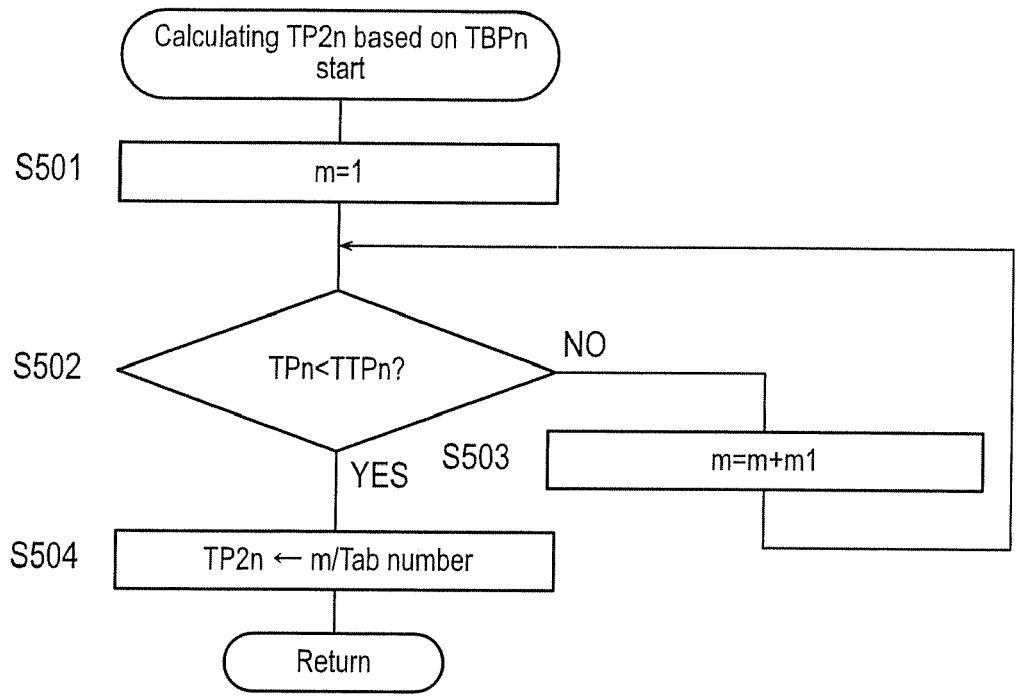
FIG. 11 is a flowchart showing the process sequence for calculating the tab position of the n-th sheet of the second tab sheets (TP2$n$) based on the bottom edge position of the first tab sheet (TBPn) in question.

Next, with reference to FIG. 11, the process of calculating the tab position of the n-th sheet of the second tab sheets (TP2$n$) based on the bottom edge position of the first tab sheet (TBPn) in question will be described.

First, an initial value "1" is set to the counter "m" (S501).

Next, a judgment is made as to whether the top edge position of the second tab sheets (TTpn) is greater than the bottom edge position of the tab of the first tab sheet in question (TBPn) or not (S502). The bottom edge position of a tab is the distance from the top edge of a tab sheet to the bottom edge of the tab, and the top edge position of the tab is the distance from the top edge of the tab sheet to the top edge of the tab.

The top edge position of the second tab sheets (TTPn) is calculated according to the following equation:

$$TTPn=((\text{vertical size of paper−top space−bottom space−gap}*(\text{Tab number}-1))/\text{Tab number})*(m-1)+\text{top space}+\text{gap}*(m-1)$$

If it is judged that TBPn≧TTPn (S502: No), the program returns to step S502 after incrementing "m" by 1 (S503). TTPn is recalculated to be used.

If it is judged that TBPn<TTPn (S502: Yes) in step S502, the tab position of the n-th sheet of the second tab sheets (TP2$n$) is given as m/Tab number (S504).

Figure 14:
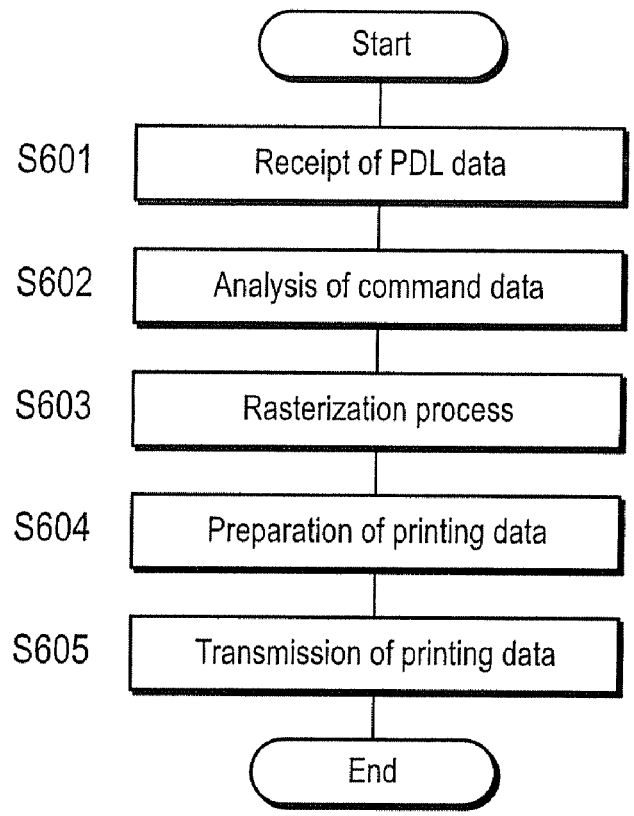
FIG. 14 is a flowchart showing the process sequence on the printer controller.

Next, the job process in the printer controller 2 will be described below referring to FIG. 14. The algorithm shown in the flowchart of FIG. 14 is stored as a program in a storage unit such as a hard disk 24 of the printer controller 2 and executed by the CPU 21.

First, the printer controller 2 receives the PDL data from the PC1 (step S601), and analyzes the command data described in the PDL data (S602). The setting information concerning the tab sheet is identified as the command data is analyzed.

Next, the received PDL data is rasterized in order to obtain bitmap data, which is bitmap type image data (S603).

Printing data is then prepared by adding header information containing setting information concerning the tab sheet to the bitmap data thus obtained in step S603 (S604), and the particular printing data is transmitted to the printer 3 as a printing job (S605).

Figure 15:
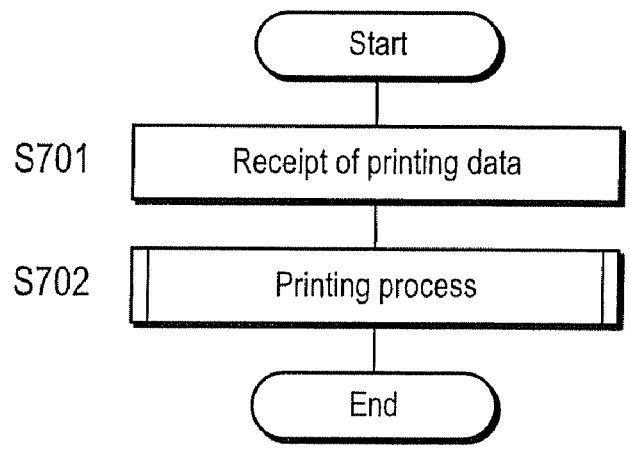
FIG. 15 is a flowchart showing the process sequence on the printer.

Next, the job process in the printer 3 will be described below referring to FIGS. 15-17. The algorithm shown in the flowcharts of FIGS. 15-17 is stored as a program in a storage unit such as a ROM 32 of the printer 3 and executed by the CPU 31.

The printer 3 receives the printing data from the printer controller 2 as the printing job (S701). Next, the printer 3 executes the printing process (S702).

Figure 16:
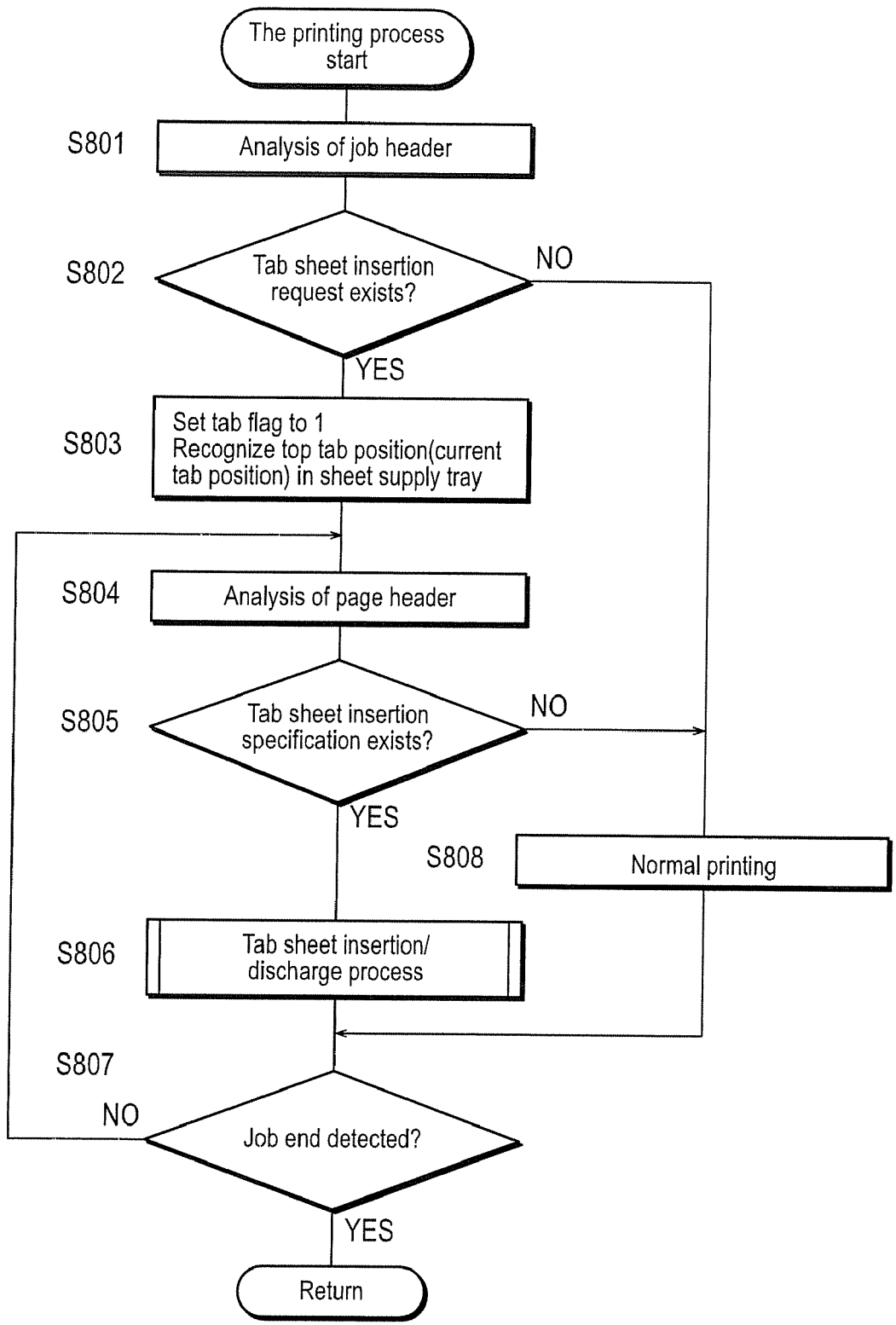
FIG. 16 is a flowchart showing the procedure of the printing process.
Figure 17:
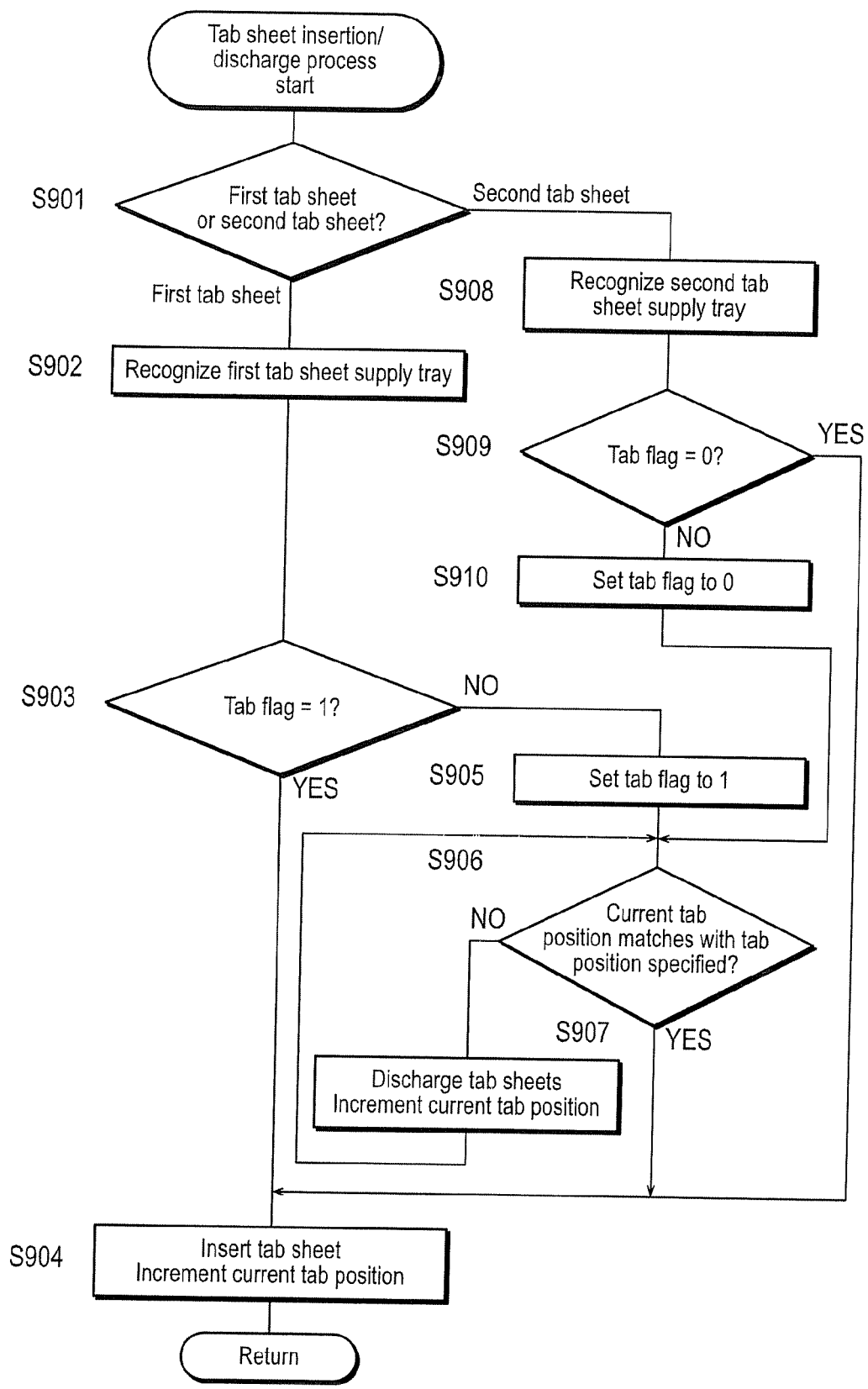
FIG. 17 is a flowchart showing the inserting/discharging process sequence of tab sheets.

As the printing process is initiated, the job header contained in the header information is first analyzed as shown in FIG. 16 (S801).

FIG. 18 is a conceptual diagram of the header information. The header information 300 comprises a job header 310 which is an additional information related to the entire printing job and a job header 320 which is an additional information related to specific pages included in the printing job.

For example, the job header 310 in FIG. 18 contains the setting information concerning the tab sheets consisting of the following contents. For example, the supply source of the first tab sheet is "Tray 1" (the sheet supply tray 51 shown in FIG. 5), the type of the first tab sheet is 5-tab, and the insertion page locations of the first tab sheet are pages 1 and 10. Also, the supply source of the second tab sheet is "Tray 2" (the sheet supply tray 52 shown in FIG. 5), the type of the second tab sheet is 5-tab, and the insertion page locations of the second tab sheet are pages 2, 4, 6, 11, 12, and 14.

In the page header 320 shown in FIG. 18, "P1," "P2," . . . denote the page numbers to be printed, "Tray1" and "Tray2" denote the sheet supply trays that supply the tab sheets to those page positions, and "JobTray" indicate that there is no tab sheet to be inserted to those pages and the sheets to be used for printing those pages are supplied from the sheet supply trays designated by the printing job.

Based on the analysis of the page header 310, a judgment is made as to whether or not there is a demand for tab sheet insertion in step S802.

If there is no request for tab sheet insertion (S802: No), normal printing, i.e., printing of one page portion is executed (S808), and the program advances to step S807.

On the other hand, if there is a tab sheet insertion request (S802: Yes), the tab flag is set to "1." At this point, the tab flag is set to "1" in case of a first tab sheet, and "0" in case of a second tab sheet. Also, the tab position of the top tab sheet in the sheet supply trays 51 and 52 ("current tab position") is recognized. The current tab sheet position is recognized by sensors (not shown) provided in the sheet supply trays. On the other hand, it can be constituted in such a way that it is recognized based on the information that is stored based on the user's input. Incidentally, the "current tab position" is stored in the storage unit such as the RAM 33 of the printer 3.

Next, the page header 320 is analyzed (S804). The analysis of the page header 320 is conducted for each process in accordance with the description of the printing job in sequence. The process on the tab sheet and the process on normal pages being printed are executed individually.

Based on the analysis of the page header 320, a judgment is made as to whether or not there is a tab sheet designation (S805).

If there is no sheet insertion designation (S805: No), normal printing, i.e., printing of one page portion is executed (S808), and the program advances to step S807.

On the other hand, if there is a tab sheet insertion designation (S805: Yes), the tab sheet insertion/discharge process is executed (S806). The details of the tab sheet insertion/discharge process will be described later.

In step S807, a judgment is made as to whether the job end of the printing data is detected or not. In other words, it is judged whether all the processes concerning the printing data have been completed or not.

If the job end is not detected (S807: No), the program returns to step S804 and executes the following process. On the other hand, if the job end is detected in step S807 (S807: Yes), it returns to the flowchart shown in FIG. 15.

Next, let us describe the tab sheet insertion/discharge process with reference to FIG. 17.

First, when it is judged that a tab sheet insertion designation exists in S805, a judgment is made as to whether the particular tab sheet is a first tab sheet or a second tab sheet (S901).

If it is judged that it is the insertion designation for a first tab sheet (S901: first tab sheet), the sheet supply tray in which the first tab sheets are stored is recognized (S902). Next, a judgment is made as to whether the particular tab flag is "1" or not (S903).

If it is judged that the particular tab flag is "1" in step S903 (S903: Yes), the program advances to step S904.

In step S904, a tab sheet is supplied from the designated sheet supply tray, and inserted in the designated page position. This tab sheet is discharged to a sheet discharge tray after printing if there is any instruction for printing on the tab. Next, the "current tab position" is incremented by 1/Tab number, and the program returns to the flowchart shown in FIG. 16. If the tab position exceeds "1," it is determined as the leading tab position.

If it is judged that the particular tab flag is not "1" in step S903 (S903: No), the tab flag is set to "1." For example, if the second tab sheet insertion is done immediately before, the tab flag is returned from "0" to "1," and the program advances to step S906.

In step S906, a judgment is made as to whether or not the "current tab position" matches with the current tab position (S906).

If the current tab position matches with the designated tab position (S906: Yes), the program advances to the step S904. However, if the current tab position does not match with the designated tab position (S906: No), the tab sheet is supplied from the designated sheet supply tray, and discharged to a sheet discharge tray different from the destination of printed matters based on the printing job through the inside of the printer 3 (S907). Next, the current tab position is incremented by 1/Tab number, and the program returns to step S906. In other words, the tab sheets are discharged until the current tab position matches with the designated tab position.

On the other hand, if it is judged that it is the insertion designation for a second tab sheet in step S901 (S901: second tab sheet), the sheet supply tray in which the second tab sheets are stored is recognized (S908). Next, a judgment is made as to whether the particular tab flag is "0" or not (S909).

If it is judged that the particular tab flag is "0" in step S909 (S909: Yes) the program advances to step S904.

If it is judged that the particular tab flag is not "0" in step S909 (S909: No), the tab flag is set to "0." For example, if the first tab sheet insertion is done immediately before, the tab flag is returned from "1" to "0," and the program advances to step S906.

In the first embodiment as described in the above, the tab position in the second tab sheet corresponding to the insertion page position designated in the second insertion page position setting part 121 is automatically set up in accordance with the tab position in the first tab sheet corresponding to the insertion page position designated in the first insertion page position setting part 111. In particular, in the first embodiment, the top edge position of the tab of the second tab sheet should preferably be set up lower than the bottom edge position of the tab of the first tab sheet inserted at a page ahead of and closest to the particular second tab sheet.

Figure 19:
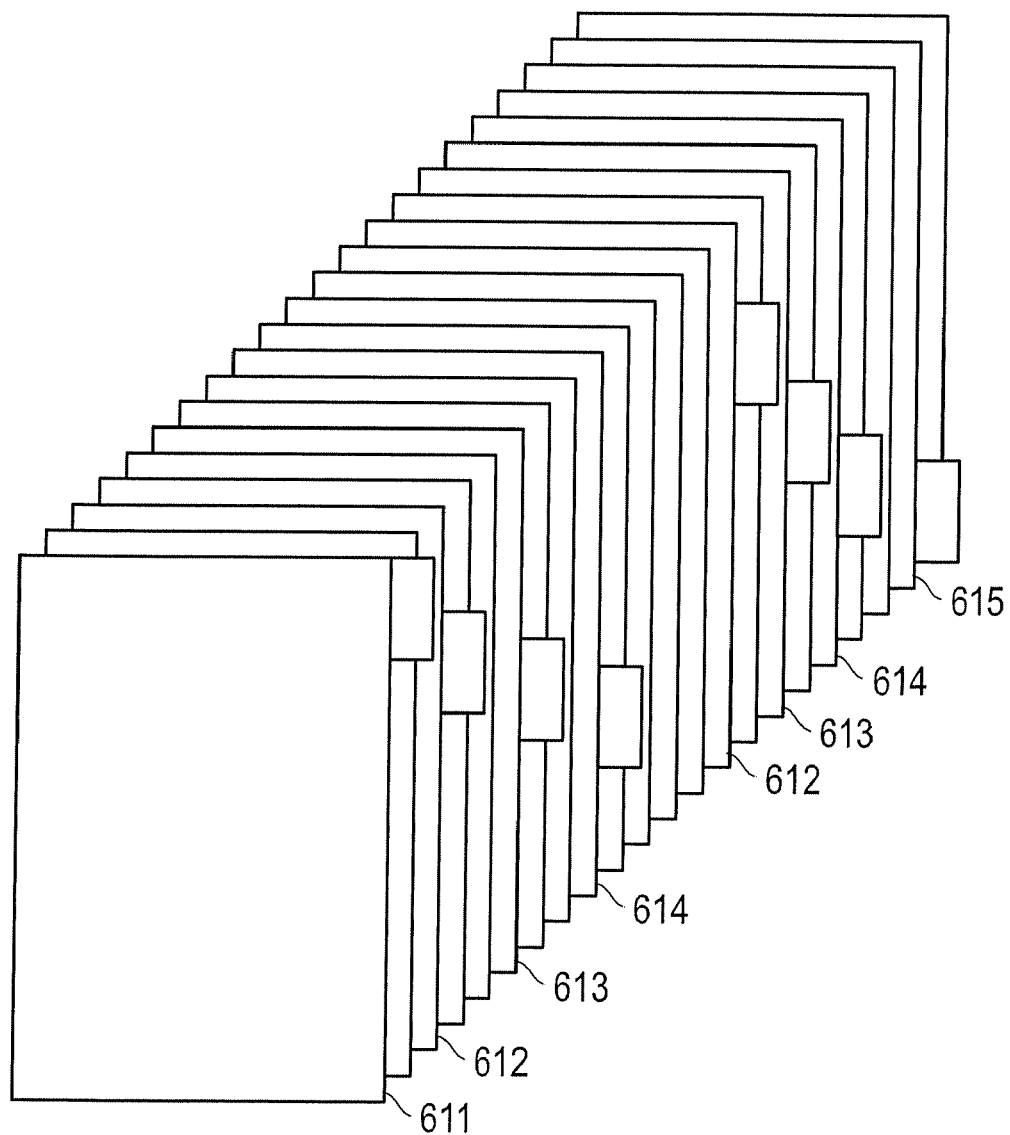
FIG. 19 is a diagram showing an example of printed matters prepared in accordance with the first embodiment.

FIG. 19 is a diagram showing an example of printed matters prepared in accordance with the first embodiment. As can be seen from the diagram, the tabs of the second tab sheets used for the breakpoints of "sections" which are the constituents of a "chapter" are arranged below the tabs of the first tab sheets which are used for the breakpoints of "chapters." Consequently, the user can differentiate the first tab sheets to be used for the breakpoints of, e.g., "chapters" from the second tab sheets to be used for the breakpoints of, e.g., "sections," and also recognize which "section" is contained in which "chapter." Therefore, the user can easily and quickly brows through a printed material and find the desired page base don the tab sheets.

Next, the second embodiment will be described below focusing primarily on the points different from the first embodiment.

While, in the first embodiment, the top edge position of a tab of a second tab sheet is set lower than the bottom edge position of the tab of the first tab sheet, which is inserted at a page ahead of and closest to the particular second tab sheet, it is different in the second embodiment in that the top edge position of a tab of a second tab sheet is set at the same level as or lower than the top edge position of the tab of the first tab sheet, which is inserted at a page ahead of and closest to the particular second tab sheet. Moreover, in the second embodiment, the bottom edge position of the tab of the second tab sheet should preferably be set up at the same level or higher than the bottom edge position of the tab of the first tab sheet inserted at a page ahead of and closest to the particular second tab sheet. In the following, more specific descriptions will be provided.

Figure 25:
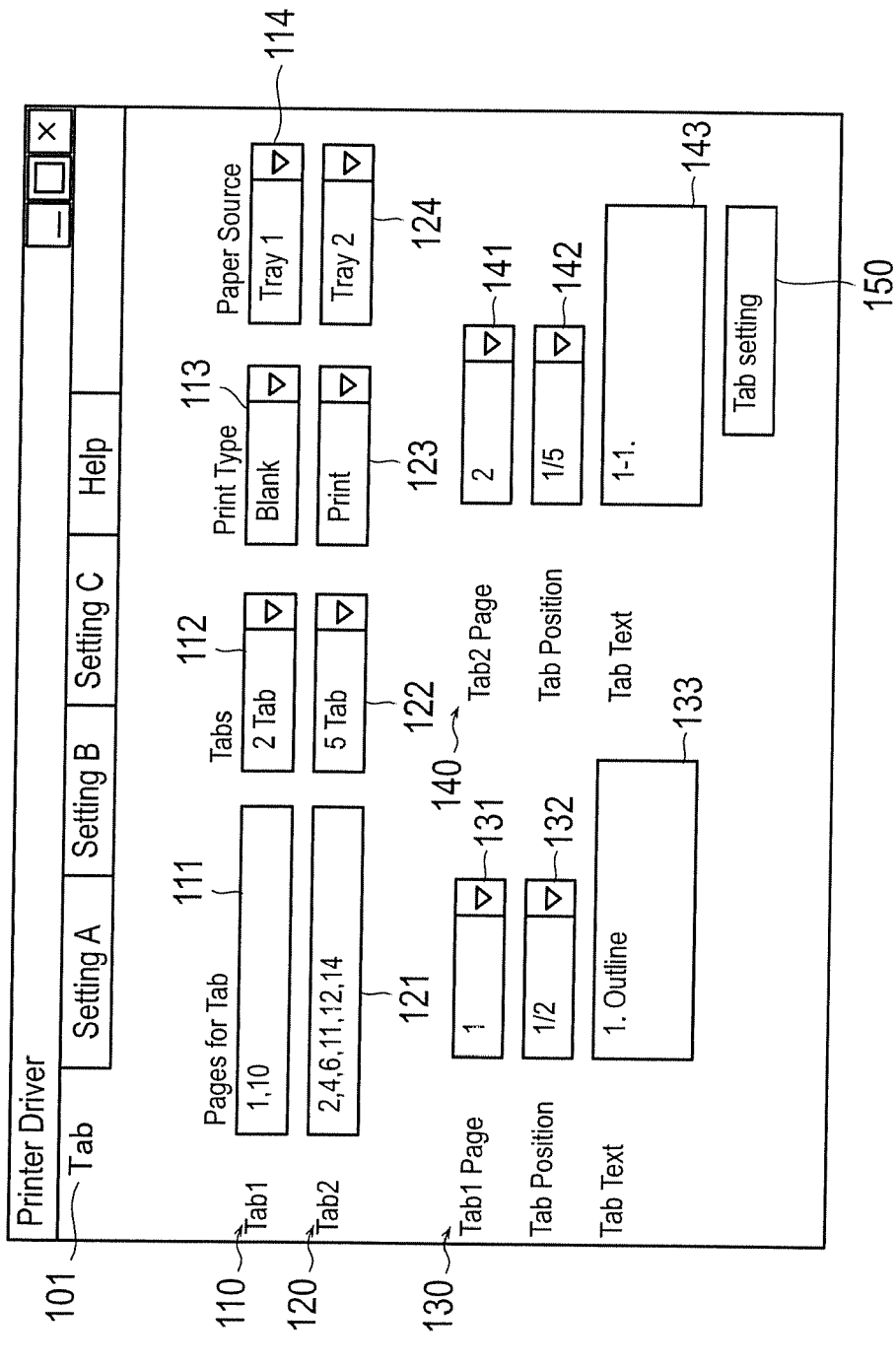
FIG. 25 is an example of tab sheet setting screen in a second embodiment.

The flowchart shown in FIG. 7 shows the procedures of the process on the PC 1 in the second embodiment same as in the first embodiment. FIG. 25 is an example of tab sheet setting screen 100a in the second embodiment. In the example shown in FIG. 25, it is designated that the type of the first tab sheets should be two-tabs and the type of the second tab sheets should be five-tabs.

FIGS. 20-24 represent a flowchart showing the process for setting up the tab position (step S104) in the second embodiment. The algorithm shown in the flowcharts of FIG. 20-FIG. 24 is stored as a program in a storage unit such as a hard disk 14 of the PC 1 and executed by the CPU 11.

Figure 20:
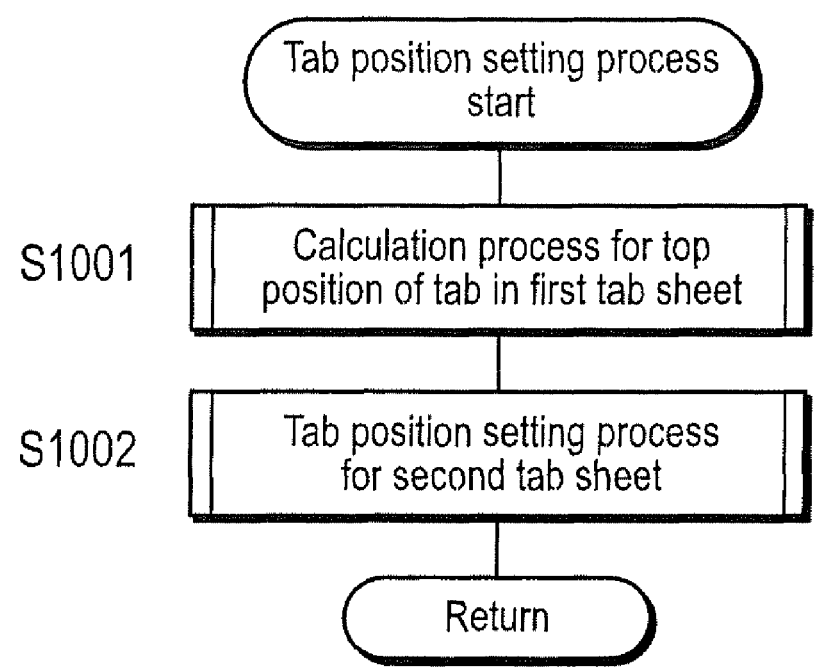
FIG. 20 is a flowchart showing the process sequence for setting up the tab position in the second embodiment.

Firstly, as shown in FIG. 20, the top edge position and the bottom edge position of the tab of the first tab sheet are calculated (S1001), and then the setting process for the tab position of the second tab sheet is executed (S1002).

Figure 21:
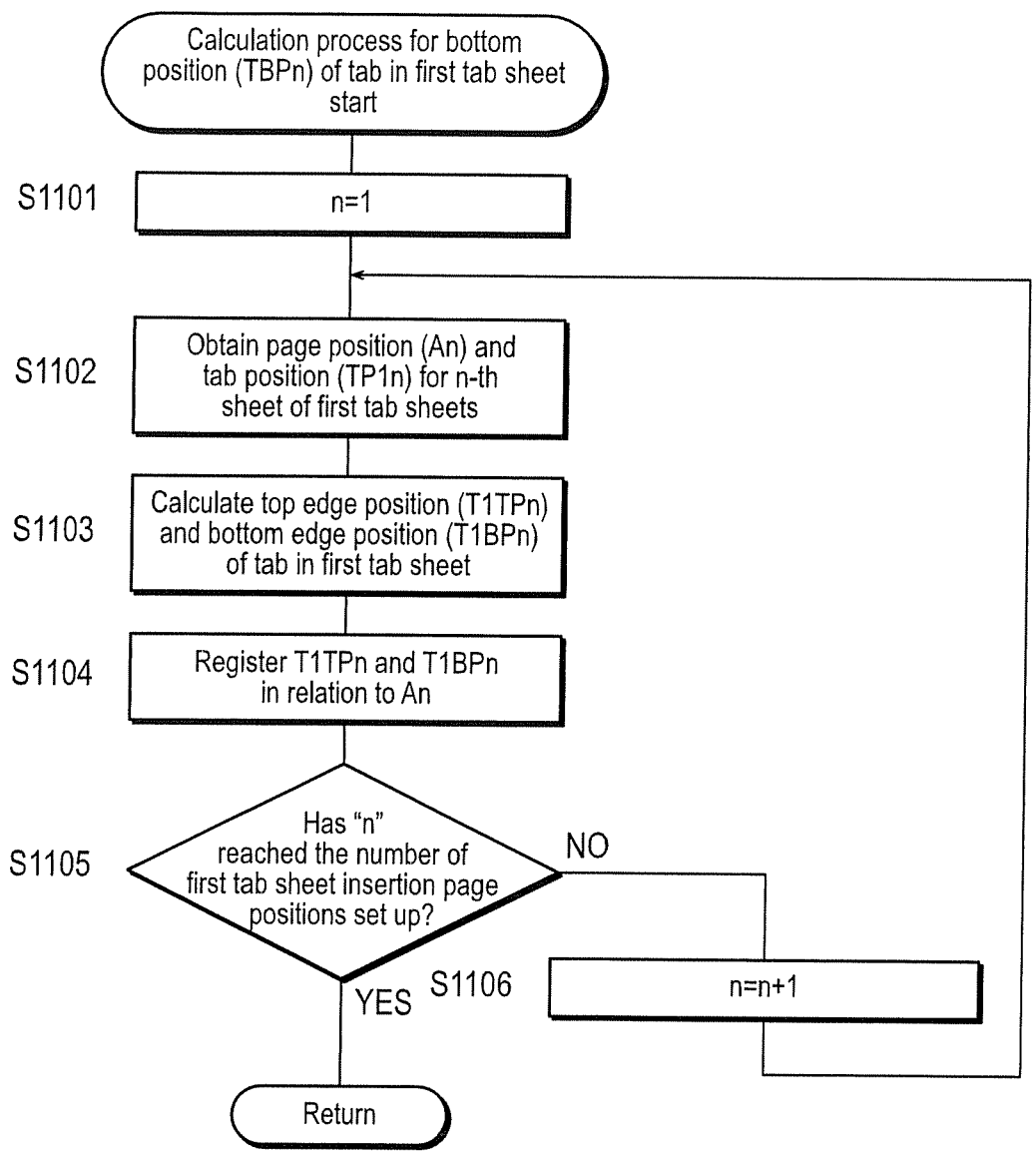
FIG. 21 is a flowchart showing the process sequence for calculating the top edge position and the bottom edge position of the tab of the first tab sheet.

FIG. 21 is a flowchart showing the process for calculating the top edge position and the bottom edge position of the tab of the first tab sheet (S1001).

Since steps S1101, S1102, S1105, and S1106 are identical in the contents as steps of S301, S302, S305, and S306 in FIG. 9, so that their explanations are omitted.

In step S1103, the top edge position (T1TPn) and the bottom edge position (T1BPn) of the tab of n-th sheet of the first tab sheets are calculated according to the following formulae:

$$T1TPn = \text{top space} + (TP1n * \text{Tab number} - 1) * (\text{gap} + \text{Tab length})$$

$$\text{Tab length} = (\text{vertical size of sheet} - (\text{top space} + \text{lower space} + (\text{Tab number} - 1) * \text{gap}) / \text{Tab number}$$

$$T1BPn = \text{top space} + (TP1n * \text{Tab number} - 1) * \text{gap} + (TP1n * \text{Tab number}) * \text{Tab length}$$

The top edge position of a tab is the distance from the top edge of a tab sheet to the top edge of the tab, and the bottom edge position of the tab is the distance from the top edge of the tab sheet to the bottom edge of the tab.

In step S1104, the top edge position (T1TPn) and the bottom edge position (T1BPn) of the tab of the n-th sheet of the first tab sheets are registered in the storage part of the RAM 13 and others in relation to the page position (An).

Figure 22:
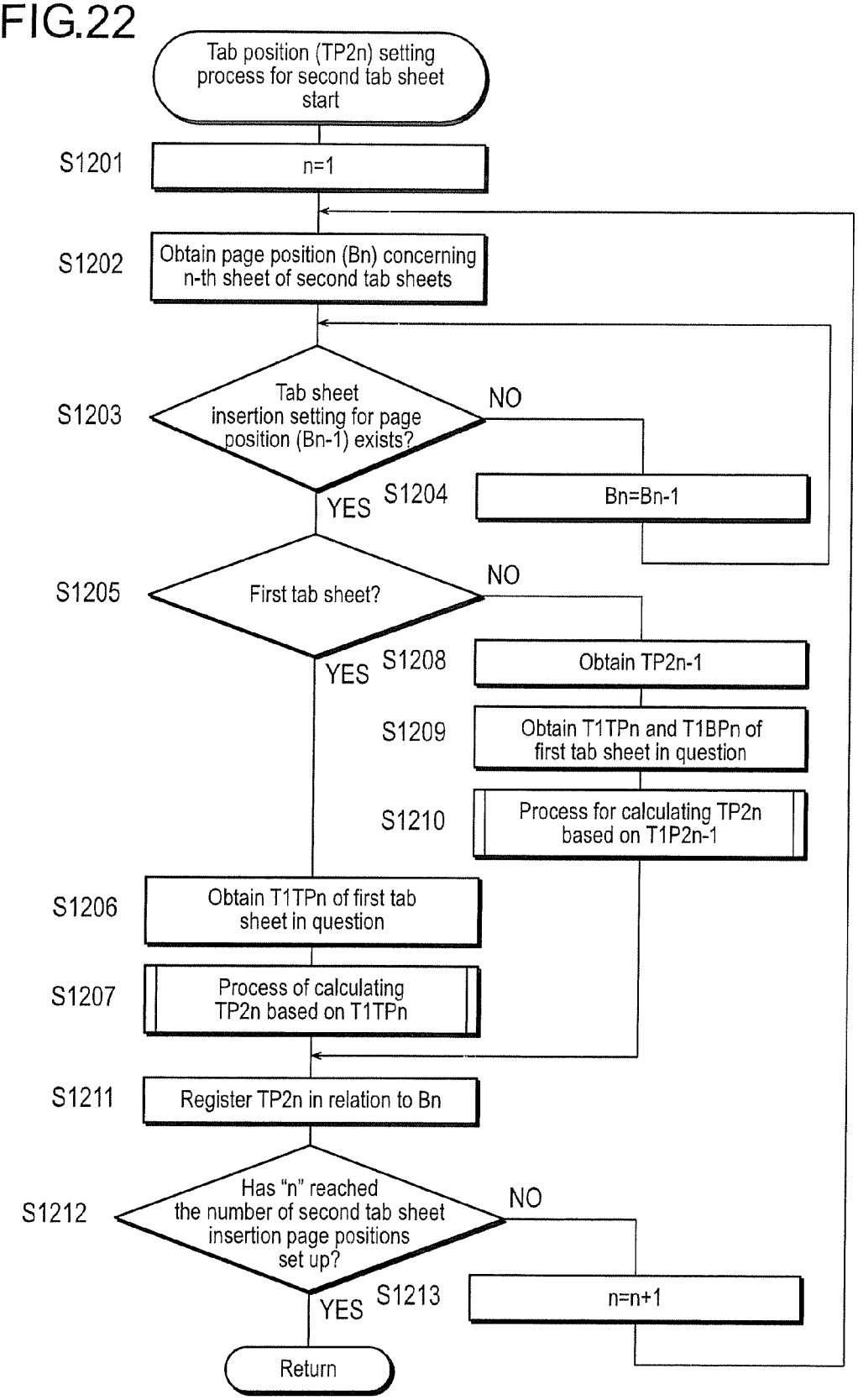
FIG. 22 is a flowchart showing the process sequence for setting up the tab position of the second tab sheet.

FIG. 22 is a flowchart showing the process for setting up the tab position of the second tab sheet (S1002).

As steps S1201, S1202, S1203, S1204, S1205, S1211, S1212, and S1213 are identical in the contents as steps of S401, S402, S403, S404, S405, S410, S411, and S412 in FIG. 10, so that their explanations are omitted.

If it is judged that the tab sheet for which the insertion setting exists is a first tab sheet (S1205: Yes), the top edge position of the tab (T1TPn) of the first tab sheet in question is recognized (S1206).

Next, the tab position of the n-th sheet of the second tab sheets (TP2n) is calculated based on the top edge position of the first tab sheet (T1TPn) in question (S1207). The detail of such a TP2n calculation process based on T1TPn will be described later.

On the other hand, if it is judged that the tab sheet for which the insertion setting exists is not a first tab sheet (S1205: No), the tab position for the (n−1)-st sheet of the second tab sheets (TP2n−1) is obtained (S1208). Next, the top edge position (T1TPn) and the bottom edge position (T1BPn) of the first tab sheet in question are obtained (S1209).

Next, the tab position of the n-th sheet of the second tab sheets (TP2n) is calculated based on the tab position of the (n−1)-st sheet of the second tab sheets (TP2n−1) (S1210). The detail of these calculation processes of TP2n based on TP2n−1 will be discussed later.

Next, with reference to FIG. 23, the process of calculating the tab position of the n-th sheet of the second tab sheets (TP2n) based on the top edge position (T1TPn) of the first tab sheet in question (S1207) will be described.

First, an initial value "1" is set to the counter "m" (S1301).

Next, a judgment is made as to whether the top edge position of the tab of the second tab sheet (T2TPn) is above the top edge position of the tab of the first tab sheet (T1TPn) or not (S502). The top edge position of the tab is the distance from the top edge of the tab sheet to the top edge of the tab.

The top edge position of the second tab sheets (T2TPn) is calculated according to the following equation:

$$T2TPn = ((\text{vertical size of paper} - \text{top space} - \text{bottom space} - \text{gap} * (\text{Tab number} - 1)) / \text{Tab number}) * (m - 1) + \text{top space} + \text{gap} * (m - 1)$$

If it is judged that T1TPn>T2TPn in step S1302 (S1302: No), the program returns to step S1302 after incrementing "m" by 1 (S1303). T2TPn is recalculated to be used.

If it is judged that T1TPn≦T2TPn (S1302: Yes) in step S1302, the tab position of the n-th sheet of the second tab sheets (TP2n) is given as m/Tab number (S1304).

Figure 24:
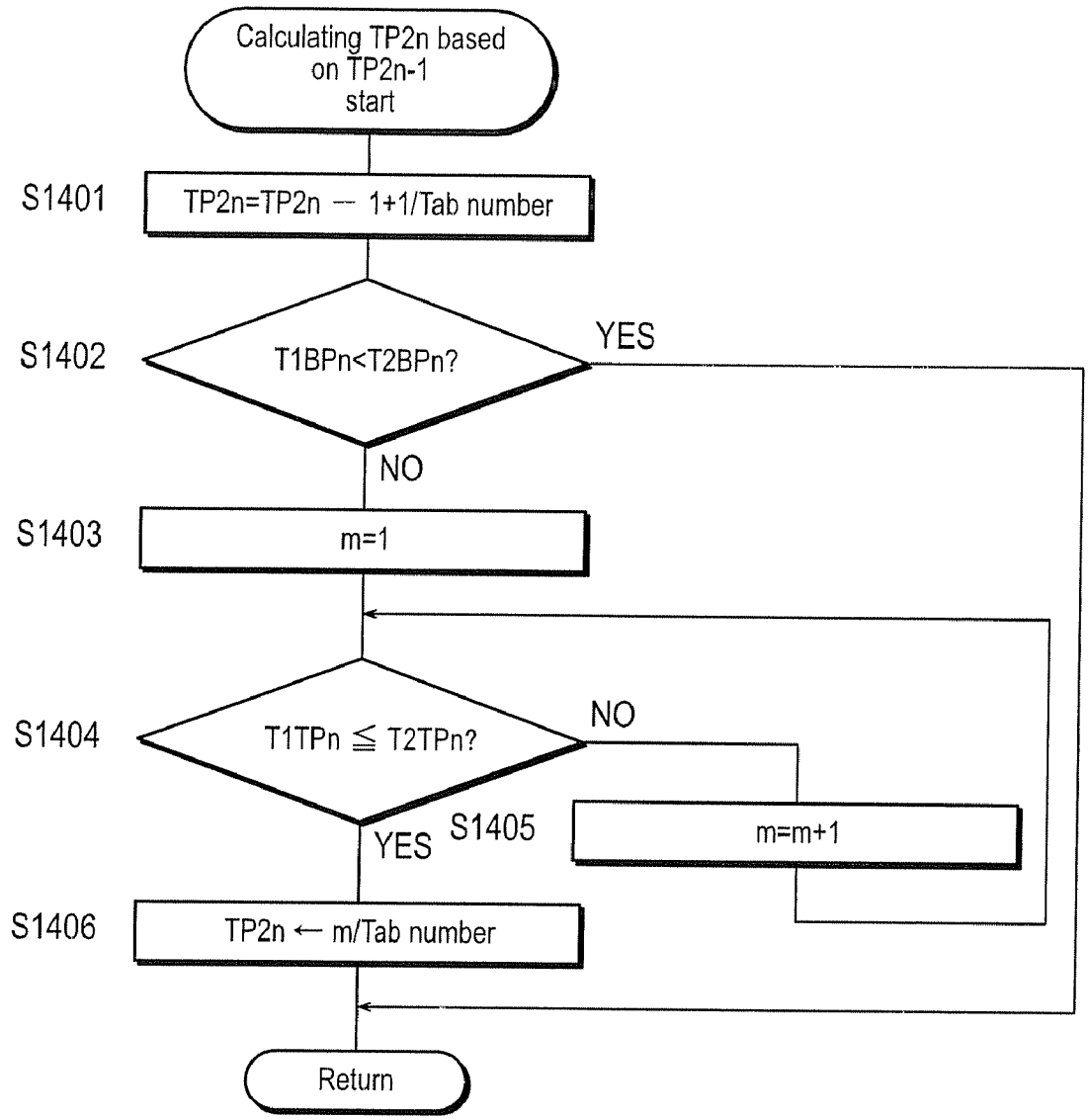
FIG. 24 is a flowchart showing the process sequence for calculating the tab position of the n-th sheet of the second tab sheets (TP2n) based on the tab position of the (n−1)st second tab sheet (TP2n−1).

Next, with reference to FIG. 24, the process of calculating the tab position of the n-th sheet of the second tab sheets (TP2n) based on the tab position of the (n−1)-st tab sheet of the second tab sheets (TP2n−1) in question (S1210) will be described.

First, in general, the tab position of the n-th sheet of the second tab sheets (TP2n) can be calculated according to the following formula:

$$TP2n = (TP2n-1) + 1/\text{Tab number (S1401)}.$$

Next, a judgment is made as to whether the bottom edge position of the tab of the second tab sheet (T2BPn) is below the bottom edge position of the tab of the first tab sheet (T1BPn) or not (S1402). Now, the bottom edge position of the tab is the distance from the top edge of the tab sheet to the bottom edge of the tab.

The bottom edge position of the second tab sheets (T2BPn) is calculated according to the following equation:

$$T2BPn(\text{vertical size of paper} - \text{top space} - \text{bottom space} - \text{gap}*(\text{Tab number}-1))*TP2n + \text{top space} + \text{gap}*(TP2n*\text{Tab number})$$

If it is judged that T1BPn≧T2BPn in step S1402 (S1402: Yes), it is judged that the value of TP2n calculated in step S1401 can be adopted and the program returns to the flowchart of FIG. 22.

On the other hand, if it is judged that T1BPn<T2BPn in step S1402 (S1402: No), it is judged that the value of TP2n calculated in step S1401 can not be adopted and the program advances to step S1403.

Figure 23:
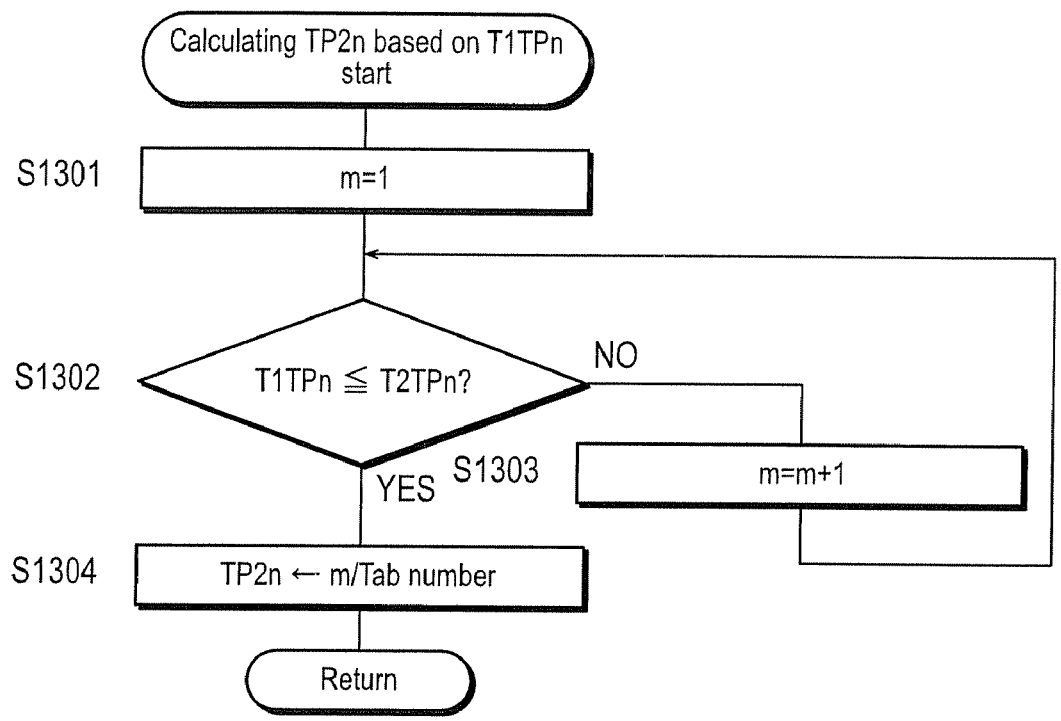
FIG. 23 is a flowchart showing the process sequence for calculating the tab position of the n-th sheet of the second tab sheets (TP2n) based on the top edge position of the first tab sheet (T1TPn) in question.

Since the steps S1403 through S1406 are identical to the steps S1301 through S1304 in FIG. 23, their descriptions are omitted.

The flowchart shown in FIG. 14 shows the process sequence on a printer controller 2 in the second embodiment. The flowchart shown in FIG. 15 shows the procedures of the process on a printer 3 in the second embodiment.

Figure 26:
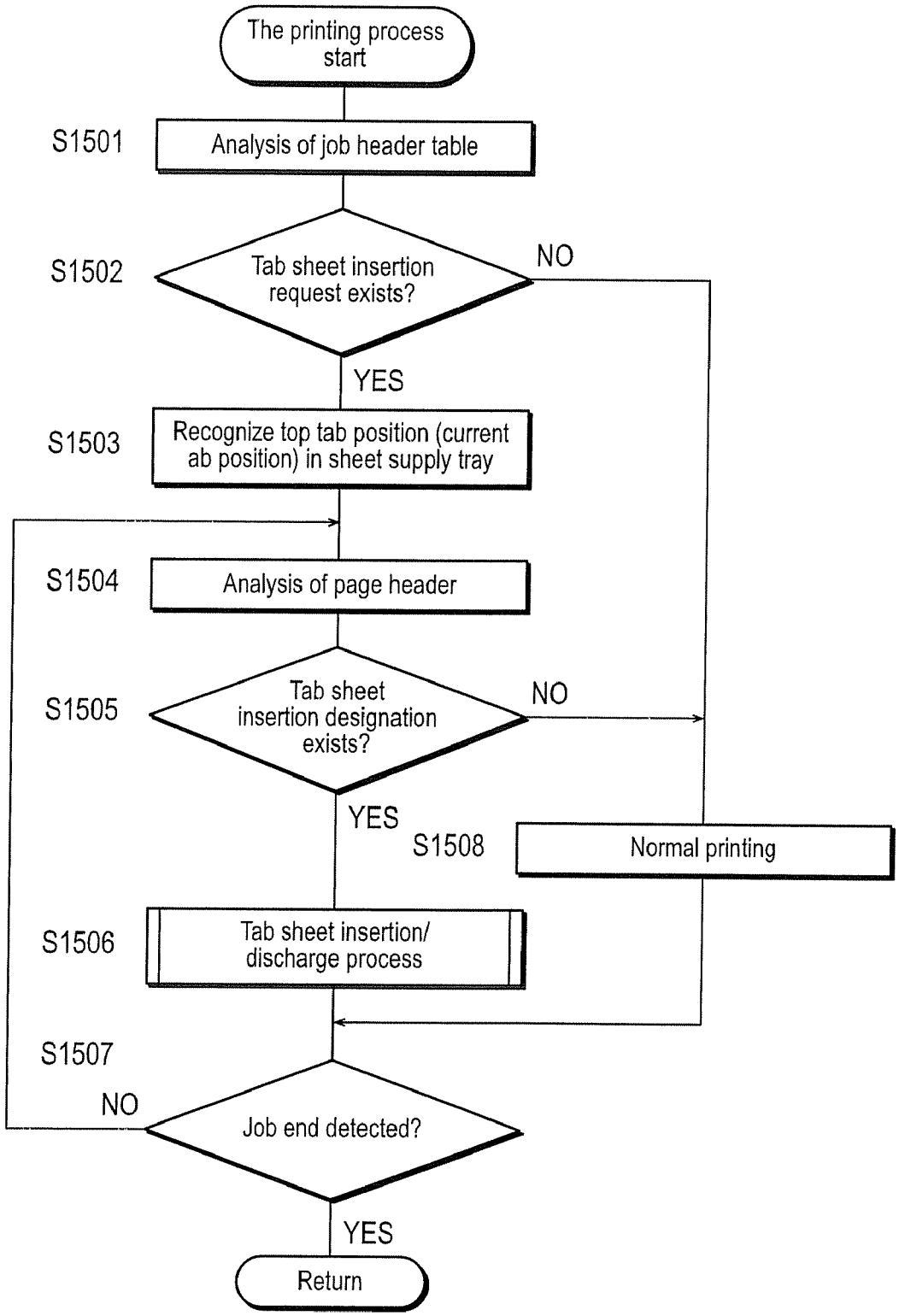
FIG. 26 is a flowchart showing the sequence of printing process in the second embodiment.
Figure 27:
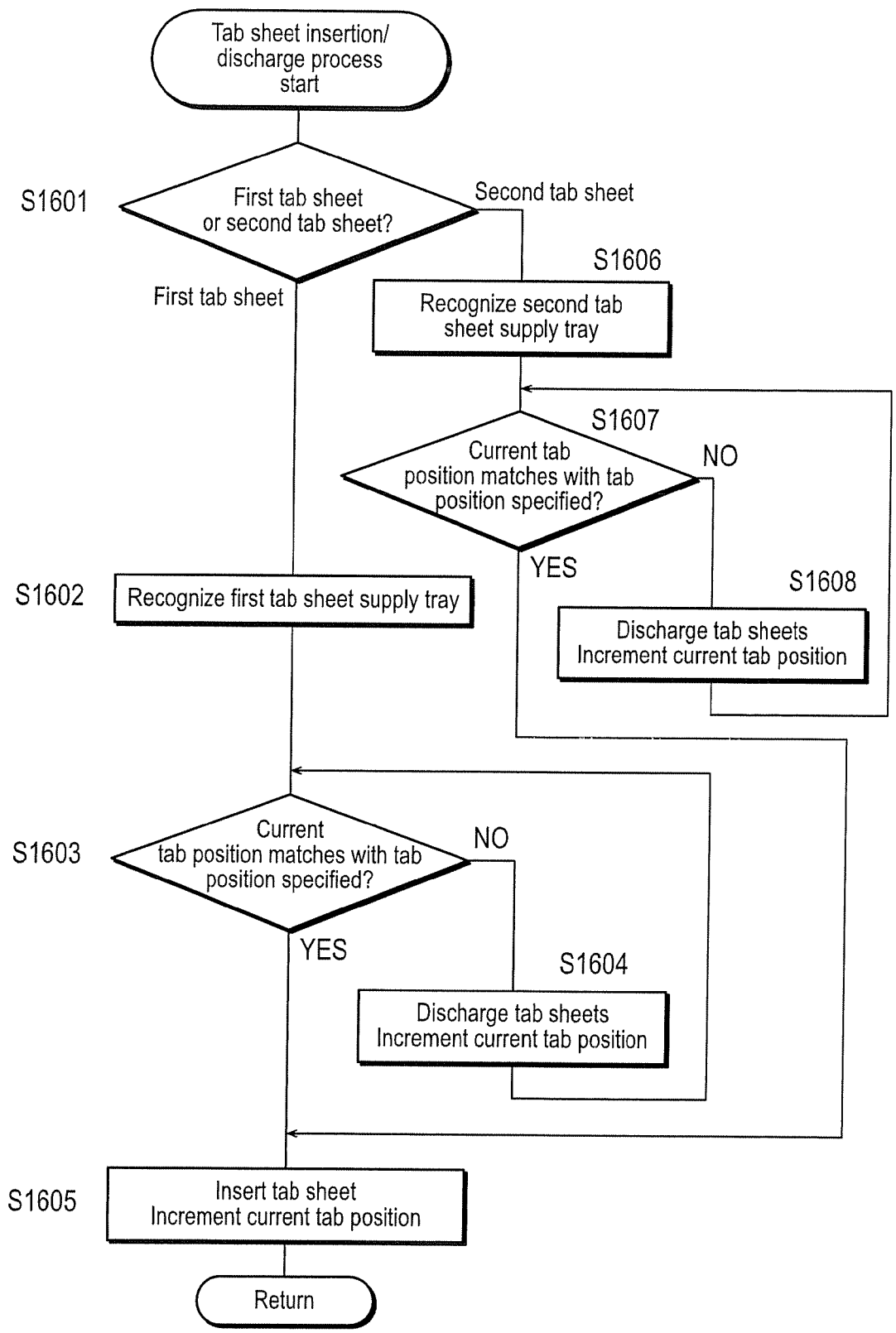
FIG. 27 is a flowchart showing the inserting/discharging process sequence of tab sheets in case of the second embodiment.

FIGS. 26 and 27 represent a flowchart showing the sequence of the printing process (step S702) in the second embodiment. The algorithm shown in the flowcharts of FIGS. 26 and 27 is stored as a program in a storage unit such as a ROM 32 of the printer 3 and executed by the CPU 31.

As steps S1501, S1502, S1504 through S1508 are identical in the contents as steps of S801, S802, S804 through S808 in FIG. 16, so that their explanations are omitted.

Figure 28:
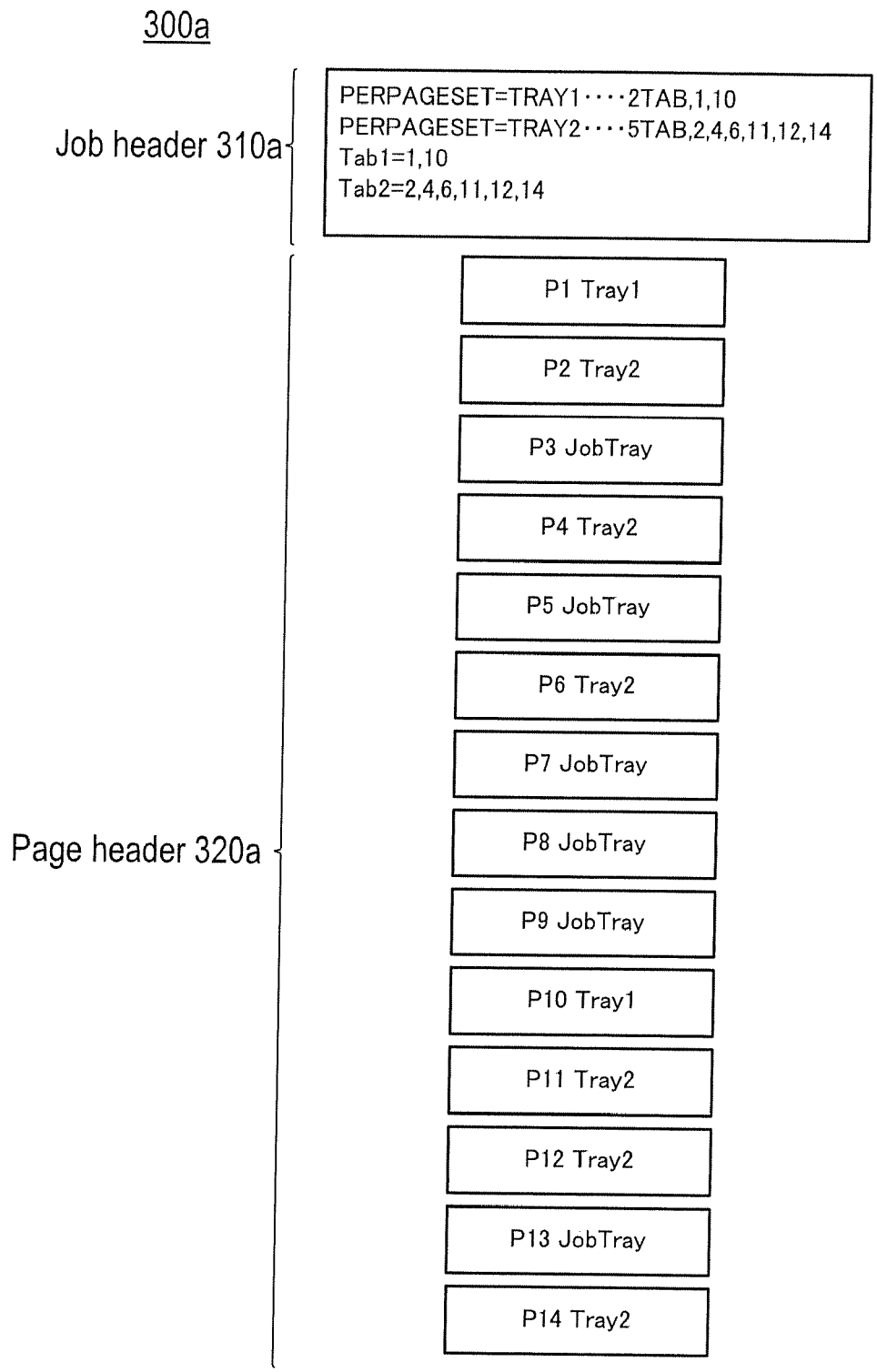
FIG. 28 is a conceptual diagram of the header information in case of the second embodiment.

FIG. 28 is a conceptual diagram of the header information in case of the second embodiment. The header information 300a consists of a job header 310a and a page header 320a.

For example, the job header 310a in FIG. 28 contains the setting information concerning the tab sheets consisting of the following contents. For example, the supply source of the first tab sheet is "Tray 1" (the sheet supply tray 51 shown in FIG. 5), the type of the first tab sheet is 2-tab, and the insertion page locations of the first tab sheet are pages 1 and 10. Also, the supply source of the second tab sheet is "Tray 2" (the sheet supply tray 52 shown in FIG. 5), the type of the second tab sheet is 5-tab, and the insertion page locations of the second tab sheet are pages 2, 4, 6, 11, 12, and 14.

Also, the tab position of the top tab sheet in the sheet supply trays 51 and 52 ("current tab position") is recognized in step S1503. The tab flag as the one used in the first embodiment is not used in the second embodiment.

Next, let us describe the tab sheet insertion/discharge process in the second embodiment with reference to FIG. 27.

First, when it is judged that a tab sheet insertion designation exists in S1505, a judgment is made as to whether the particular tab sheet is a first tab sheet or a second tab sheet (S1601).

If it is judged that it is the insertion designation for a first tab sheet (S1601: first tab sheet), the sheet supply tray in which the first tab sheets are stored is recognized (S1602).

Next, a judgment is made as to whether the current tab position matches with the designated tab position with regard to the first tab sheet (S1603).

If the current tab position matches with the designated tab position (S1603: Yes), the program advances to the step S1605. However, if the current tab position does not match with the designated tab position (S1603: No), the tab sheet is supplied from the designated sheet supply tray, and discharged to a sheet discharge tray different from the destination of printed matters based on the printing job through the printer 3 (S1604). Next, the current tab position is incremented by 1/Tab number, and the program returns to step S1603. In other words, the tab sheets are discharged until the current tab position matches with the designated tab position.

On the other hand, if it is judged that it is the insertion designation for a second tab sheet in step S1601 (S1601: second tab sheet), the sheet supply tray in which the second tab sheets are stored is recognized (S1606).

Next, a judgment is made as to whether or not the current tab position matches with the designated tab position with regard to the second tab sheet (S1607).

If the current tab position matches with the designated tab position (S1607: Yes), the program advances to the step S1605. However, if the current tab position does not match with the designated tab position (S1607: No), the tab sheet is supplied from the designated sheet supply tray, and discharged to a sheet discharge tray different from the destination of printed matters based on the printing job through the inside of printer 3 (S1608). Next, the current tab position is incremented by 1/Tab number, and the program returns to step S1603. In other words, the tab sheets are discharged until the current tab position matches with the designated tab position.

In step S1605, a tab sheet is supplied from the designated sheet supply tray, and inserted in the designated page position. This tab sheet is discharged to a sheet discharge tray after printing if there is any instruction for printing on the tab. Next, the "current tab position" is incremented by 1/Tab number, and the program returns to the flowchart shown in FIG. 26.

In the second embodiment as described in the above, the tab position in the second tab sheet corresponding to the insertion page position designated in the second insertion page position setting part 121 is also automatically set up in accordance with the tab position in the first tab sheet corresponding to the insertion page position designated in the first insertion page position setting part 111. In particular, in the second embodiment, the top edge position of the tab of the second tab sheet should preferably be set up at the same level or lower than the top edge position of the tab of the first tab sheet inserted at a page ahead of and closest to the particular second tab sheet. Moreover, in the second embodiment, the bottom edge position of the tab of the second tab sheet should preferably be set up at the same level or higher than the bottom edge position of the tab of the first tab sheet inserted at a page ahead of and closest to the particular second tab sheet.

Figure 29:
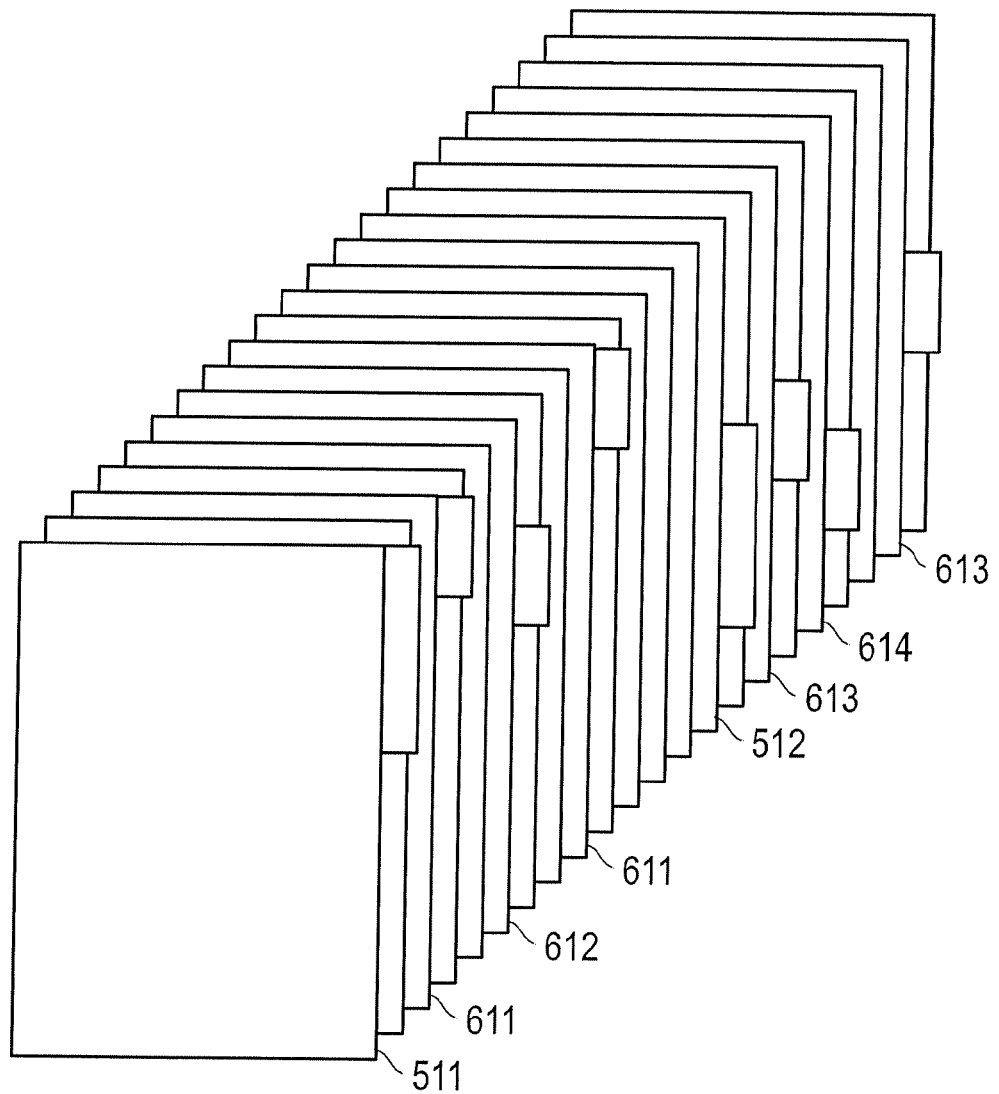
FIG. 29 is a diagram showing an example of printed matters prepared in accordance with the second embodiment.

FIG. 29 is a diagram showing an example of printed matters prepared in accordance with the second embodiment. As can be seen from the diagram, the tabs of the second tab sheets used for the breakpoints of "sections" which are the constituents of a "chapter" are arranged within a certain range along the lengthwise direction of the tabs of the first tab sheets which are used for the breakpoints of "chapters." Consequently, the user can differentiate the first tab sheets to be used for the breakpoints of, e.g., "chapters" from the second tab sheets to be used for the breakpoints of, e.g., "sections," and also recognize which "section" is contained in which "chapter." Therefore, the user can easily and quickly brows through a printed material and find the desired page base don the tab sheets.

Next, the third embodiment will be described below focusing primarily on the points different from the second embodiment.

While, in the second embodiment, the bottom edge position of a tab of a second tab sheet is set at the same level or higher than the bottom edge position of the tab of the first tab sheet, which is inserted at a page ahead of and closest to the particular second tab sheet, it is different in the third embodiment in that the bottom edge position of a tab of a second tab sheet is set at the same level as or higher than the top edge position of the tab of the first tab sheet, which is inserted at a page after and closest to the particular second tab sheet. If the tab of the first tab sheet to be inserted after and closest to the second tab sheet is at the last tab position, the bottom position of the tab of the second tab sheet is set at the same level or higher than the bottom edge of the tab sheet.

In other words, in the process of the third embodiment, the top edge position of the tab of the first tab sheet to be inserted at the following page is used instead of the bottom edge position of the tab of the first tab sheet to be inserted at the preceding page used in the process of the second embodiment. Therefore, the embodiment can be implemented with a similar process as in the second embodiment.

In the third embodiment, the tab position in the second tab sheet corresponding to the insertion page position designated in the second insertion page position setting part 121 is also automatically set up in accordance with the tab position in the first tab sheet corresponding to the insertion page position designated in the first insertion page position setting part 111. In particular, in the third embodiment, the top edge position of the tab of the second tab sheet should preferably be set up at the same level or lower than the top edge position of the tab of the first tab sheet inserted at a page preceding and closest to the particular second tab sheet. Moreover, in the third embodiment, the bottom edge position of the tab of the second tab sheet should preferably be set up at the same level or higher than the top edge position of the tab of the first tab sheet inserted at a page following and closest to the particular second tab sheet.

Figure 30:
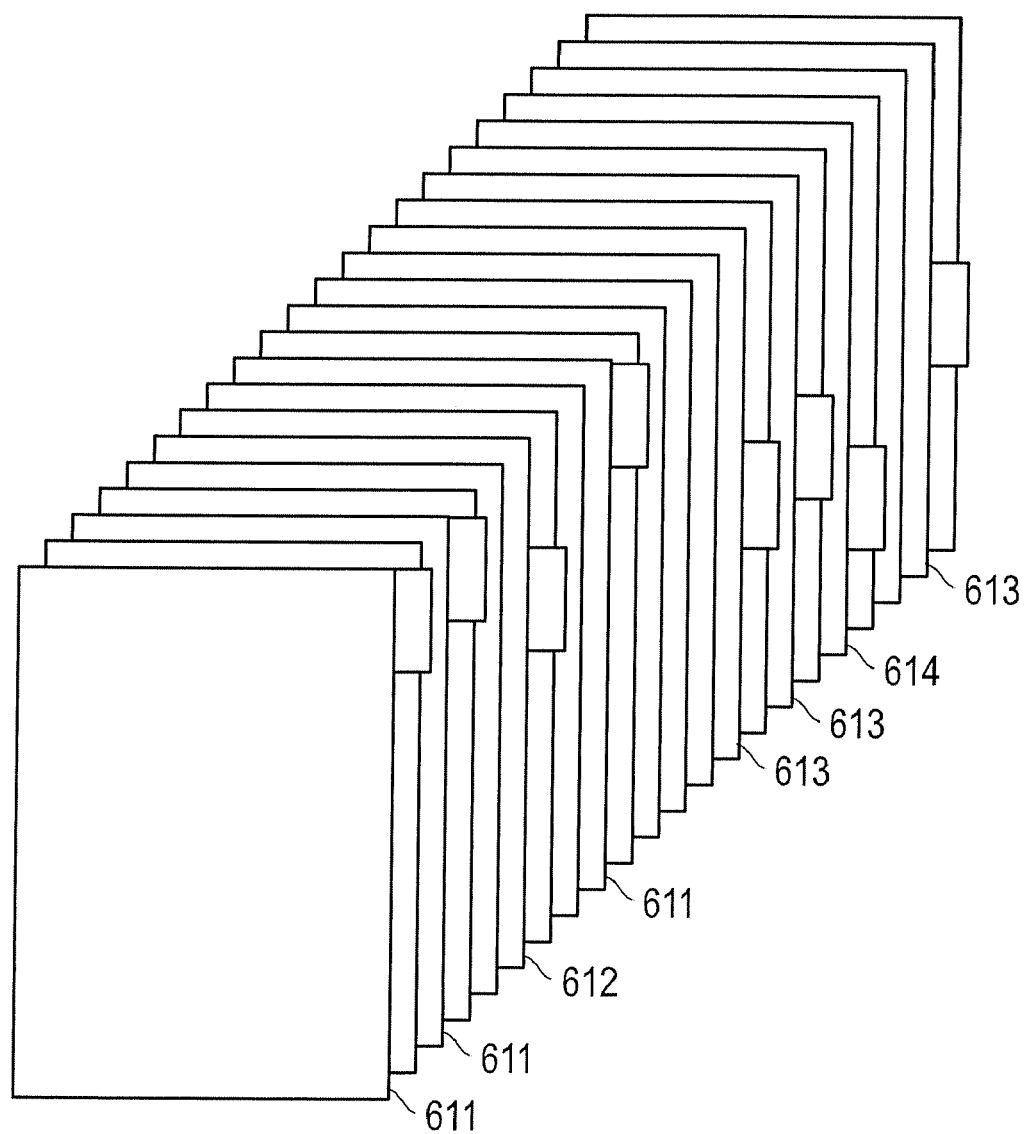
FIG. 30 is a diagram showing an example of printed matters prepared in accordance with the third embodiment.

FIG. 30 is a diagram showing an example of printed matters prepared in accordance with the third embodiment. As can be seen in the above, the tabs of the second tab sheets used at the breakpoints of constituents, e.g., "sections," of a certain "chapter" are arranged within a range between the top edge position of the tab of the first tab sheet used at the breakpoint of said "chapter" and the top edge position of the first tab sheet used at the next "chapter." Consequently, the user can differentiate the first tab sheets to be used for the breakpoints of, e.g., "chapters" from the second tab sheets to be used for the breakpoints of, e.g., "sections," and also recognize which "section" is contained in which "chapter." Therefore, the user can easily and quickly brows through a printed material and find the desired page base don the tab sheets. The third embodiment is also applicable to a case when the first tab sheet and the second tab sheet are of the same kind (e.g., of five-tabs).

The invention is not limited to the embodiment described above, but also can be changed in various ways within the scope of the claims.

For example, in the aforementioned embodiments, although it is constituted in such a way that the settings for the first tab sheets and the second tab sheets are conducted on the tab sheet setting screen, it can also be constituted in such a way that the setting is conducted more specifically for the chapter tab sheets used for "chapters" of a document and the section tab sheets used for "sections" of a document respectively.

Also, although a case of two types of tab sheets are inserted is described in the above embodiments, the present invention is applicable to a case inserting three or more types of tab sheets as well.

Moreover, although it is described in the above embodiment a case of the process of setting up tab sheets being executed by the printer driver, it can be executed by an application instead of the printer driver.

Further, although it is described in the above embodiment a case of the setting concerning tab sheets is conducted using the tab sheet setting screen 100, which is displayed on the display 15 of the PC 1, it can be executed using the tab sheet setting screen, which is displayed on the operating panel unit 34 of the printer 3.

Furthermore, although it is describe in the above embodiment a constitution wherein the printing system 4 is divided into the printer controller 2 and the printer 3, both of which are locally connected, the printer controller 2 can be built into the printer 3.

Also, although the embodiments described above uses a printer as the image forming apparatus, the invention is not limited to it. The present invention is applicable to an image forming apparatus such as MFP (Multi-Function Peripheral) and a copying machine as well.

The means and method of conducting various processes in the network system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the image processing device as a part of its function.

What is claimed is:

1. A non-transitory computer readable recording medium storing a control program for controlling an image forming apparatus, said control program causing a computer to execute a process comprising:
   1) receiving a request for initiating a setting concerning tab sheets;
   2) providing a user with a first insertion page position setting part that allows the user to designate insertion page positions at which first tab sheets are to be inserted, respectively;
   3) providing the user with a second insertion page position setting part that allows the user to designate insertion page positions at which second tab sheets are to be inserted, respectively; and
   4) setting up tab height positions in the first tab sheets corresponding to the insertion page positions designated in said first insertion page position setting part, and automatically setting up tab height positions in the second tab sheets corresponding to the insertion page positions designated in said second insertion page position setting part based on the tab height positions of the first tab sheets.

2. The non-transitory computer readable recording medium as claimed in claim 1, wherein the positions of the tabs of the first tabs that correspond to the insertion page positions designated by said first insertion page position setting part are set up by an instruction of the user.

3. The non-transitory computer readable recording medium as claimed in claim 1, wherein in said step 4), a top edge position of the tab of each of the second tab sheets is set up to be lower than a bottom edge position of the tab of the first tab sheet inserted at a page ahead of and closest to the particular second tab sheet.

4. The non-transitory computer readable recording medium as claimed in claim 1, wherein in said step 4), a top edge position of the tab of each of the second tab sheets is set up to be the same level or lower than a top edge position of the tab of the first tab sheet inserted at a page ahead of and closest to the particular second tab sheet.

5. The non-transitory computer readable recording medium as claimed in claim 4, wherein In said step 4), a bottom edge position of the tab of each of the second tab sheets is further set up to be the same level or higher than a bottom edge position of the tab of the first tab sheet inserted at a page ahead of and closest to the particular second tab sheet.

6. The non-transitory computer readable recording medium as claimed in claim 4, wherein In said step 4), a bottom edge position of the tab of the each of the second tab sheets is further set up to be the same level or higher than a top edge position of the tab of the first tab sheet inserted at a page after and closest to the particular second tab sheet.

7. The non-transitory computer readable recording medium as claimed in claim 1, wherein the tab height positions are either the distance from the bottom edge of a tab of a tab sheet to the bottom edge of the tab sheet, or the distance from the top edge of a tab of a tab sheet to the top edge of the tab sheet.

8. The non-transitory computer readable recording medium as claimed in claim 1, wherein the insertion page positions at which the first tab sheets are to be inserted correspond to the beginning of sections of a document, and the insertion page positions at which second tab sheets are to be inserted correspond to subsections within the sections.

9. The non-transitory computer readable recording medium as claimed in claim 1, wherein the second tab sheets are to be inserted at positions between the positions at which first tab sheets are to be inserted.

10. An image forming apparatus, comprising:

a receiving part for receiving a request for initiating a setting concerning tab sheets;

a first insertion page position setting part that allows a user to designate insertion page positions at which first tab sheets are to be inserted, respectively;

a second insertion page position setting part that allows the user to designate insertion page positions at which second tab sheets are to be inserted, respectively;

a central processing unit for setting up tab height positions in the first tab sheets corresponding to the insertion page positions designated in said first insertion page position setting part, and automatically setting up tab height positions in the second tab sheets corresponding to the insertion page positions designated in said second insertion page position setting part based on the tab height positions of the first tab sheets.

11. The image forming apparatus as claimed in claim 10, wherein the tab height positions are either the distance from the bottom edge of a tab of a tab sheet to the bottom edge of the tab sheet, or the distance from the top edge of a tab of a tab sheet to the top edge of the tab sheet.

12. The image forming apparatus as claimed in claim 10, wherein the insertion page positions at which the first tab sheets are to be inserted correspond to the beginning of sections of a document, and the insertion page positions at which second tab sheets are to be inserted correspond to subsections within the sections.

13. The image forming apparatus as claimed in claim 10, wherein the second tab sheets are to be inserted at positions between the positions at which first tab sheets are to be inserted.

14. A method executed on an image forming apparatus comprising:

1) receiving a request for initiating a setting concerning tab sheets; and 2) providing a user with a first insertion page position setting part that allows the user to designate insertion page positions at which first tab sheets are to be inserted, respectively;

3) providing the user with a second insertion page position setting part that allows the user to designate insertion page positions at which second tab sheets are to be inserted; and 4) setting up tab height positions in the first tab sheets corresponding to the insertion page positions designated in said first insertion page position setting part, and automatically setting up tab height positions in the second tab sheets corresponding to the insertion page positions designated in said second insertion page position setting part based on the tab height positions of the first tab sheets.

15. The method as claimed in claim 14, wherein the tab height positions are either the distance from the bottom edge of a tab of a tab sheet to the bottom edge of the tab sheet, or the distance from the top edge of a tab of a tab sheet to the top edge of the tab sheet.

16. The method as claimed in claim 14, wherein the insertion page positions at which the first tab sheets are to be inserted correspond to the beginning of sections of a document, and the insertion page positions at which second tab sheets are to be inserted correspond to subsections within the sections.

17. The method as claimed in claim 14, wherein the second tab sheets are to be inserted at positions between the positions at which first tab sheets are to be inserted.

* * * * *